United States Patent
Wada et al.

[11] Patent Number: 6,144,529
[45] Date of Patent: Nov. 7, 2000

[54] SLIDER WITH NEGATIVE AND POSITIVE PRESSURE GENERATING PORTIONS AND HEAD INCLUDING THE SAME

[75] Inventors: Yoshimitsu Wada, Kashiwa; Tetsuya Roppongi, Kawasaki; Takeshi Wada, Ichikawa; Isamu Sato, Tokyo, all of Japan

[73] Assignee: TDK Corporation, Tokyo, Japan

[21] Appl. No.: 09/046,790

[22] Filed: Mar. 24, 1998

[30] Foreign Application Priority Data

| Mar. 25, 1997 | [JP] | Japan | 9-072494 |
| Sep. 10, 1997 | [JP] | Japan | 9-245736 |
| Feb. 10, 1998 | [JP] | Japan | 10-028925 |

[51] Int. Cl.$^7$ .................................................. G11B 5/60
[52] U.S. Cl. ................... 360/236.1; 360/235.6; 360/235.7; 360/235.8; 360/235.9; 360/236; 360/236.3
[58] Field of Search ............................................. 360/103

[56] References Cited

U.S. PATENT DOCUMENTS

| 3,823,416 | 7/1974 | Warner . | |
| 4,734,803 | 3/1988 | Nishihira . | |
| 4,870,519 | 9/1989 | White . | |
| 4,894,740 | 1/1990 | Chhabra et al. . | |
| 5,287,235 | 2/1994 | Cunningham et al. . | |
| 5,726,831 | 3/1998 | White | 360/103 |
| 5,777,825 | 7/1998 | Dorius | 360/103 |
| 5,796,551 | 8/1998 | Samuelson | 360/103 |
| 5,798,889 | 8/1998 | Dorius | 360/103 |

FOREIGN PATENT DOCUMENTS

| 57-569 | 1/1982 | Japan . |
| 64-21713 | 1/1989 | Japan . |
| 4-68706 | 11/1992 | Japan . |
| 7-1619 | 1/1995 | Japan . |
| 8-45220 | 2/1996 | Japan . |
| 2503166 | 3/1996 | Japan . |
| 2573236 | 10/1996 | Japan . |

*Primary Examiner*—A. J. Heinz
*Attorney, Agent, or Firm*—Oblon, Spivak, McClelland, Maier & Neustadt, P.C.

[57] ABSTRACT

The present invention is directed to a slider, a head, a head device and a read/write apparatus that are extremely effective for achieving high density writing and an increase in the storage capacity.

The slider comprises a front flat surface, a first positive pressure generating portion, a second positive pressure generating portion and a first negative pressure generating portion. The front flat surface, which is provided starting at a leading edge, ends at an intermediate point along a lengthwise direction. The first and second positive pressure generating portions have flat surfaces which are essentially of equal heights and are positioned separated from each other over a distance at two sides in a widthwise direction running perpendicular to a lengthwise direction, with edges at one end located toward the leading edge forming step faces rising up from the front flat surface in a step. The first negative pressure generating portion is provided behind the front flat surface relative to the airflow direction and has a base surface with a height which is lower than the height of the front flat surface.

44 Claims, 32 Drawing Sheets

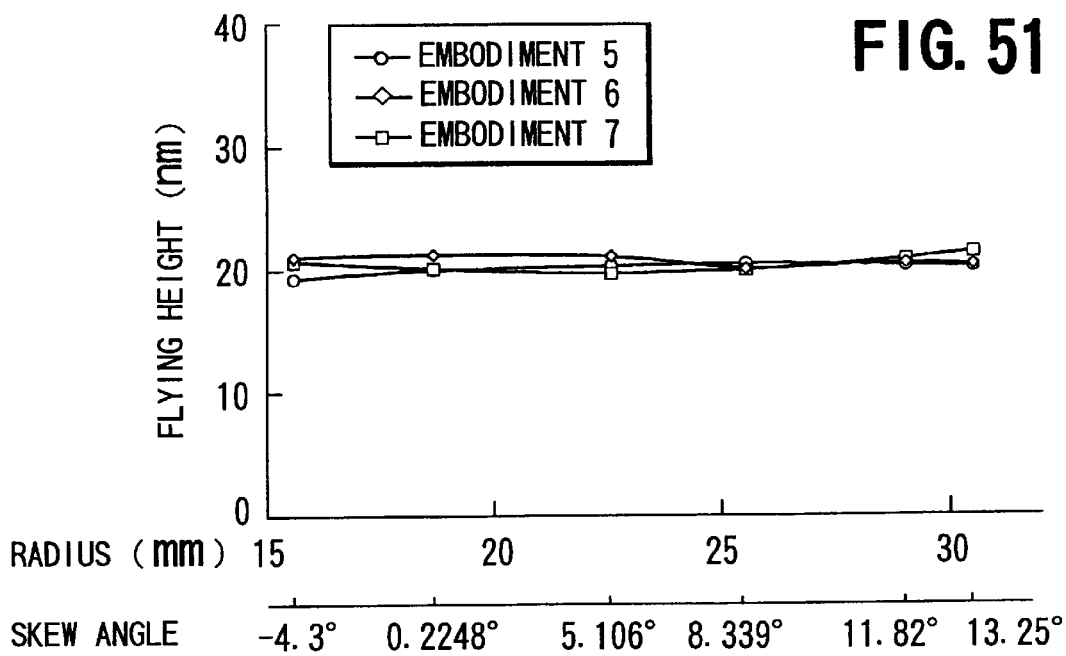
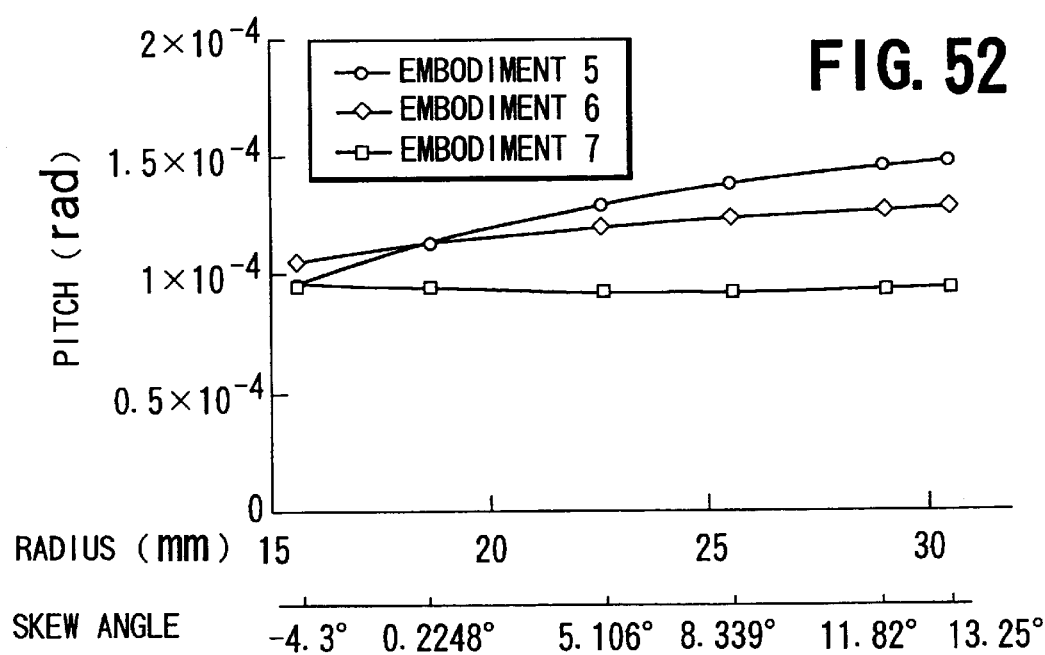

SLIDER WITH NEGATIVE AND POSITIVE PRESSURE GENERATING PORTIONS AND HEAD INCLUDING THE SAME

BACKGROUND OF THE INVENTION

1. Field of the Invention

The present invention relates to a slider, a head, a head device and a read/write apparatus.

2. Discussion of Background

In a read/write apparatus that is employed as an external writing apparatus for a computer, a flying type head that generates a lift force at the slider to cause it to fly over a disk-like medium by applying the principle of dynamic air pressure is employed. In this type of read/write apparatus, the slider is in contact with the disk-like medium when the disk-like medium is in a stopped state and when the disk-like medium rotates, air flow generated by the rotation acts on the air bearing surface of the slider to cause it to fly over the disk-like medium while maintaining a specific flying height to perform read/write of information. Typical read/write apparatuses used to date are magnetic read/write apparatuses in which a magnetic disk and a magnetic head having a slider are employed. Japanese Examined Patent Publication No. 569/1982 and U.S. Pat. No. 3,823,416 disclose taper flat type sliders.

One of the essential requirements that a read/write apparatus must satisfy to achieve high density writing is a reduction in the flying height. In recent years, high density writing performed by read/write apparatuses has necessitated a reduction in the flying height at a portion of the slider where the transducer is provided down to 25 nm or less. In addition, when adopting zone bit writing, whereby writing is performed at the maximum writing density over the entire surface of the disk-like medium, it is desirable that the flying height be as consistent as possible over the entire seek area from the inner track to the outer track of the disk-like medium.

In addition, as a means for achieving a larger storage capacity in a magnetic storage device, a head which employs a magnetoresistive element (hereafter referred to as an MR element) as a read element has been proposed and put into practical use. Unlike in an inductive transducer of the prior art whose signal output is dependent upon the circumferential speed of the disk-like medium, the signal output in an MR element is not dependent upon the circumferential speed of the disk-like medium. As a result, in a head employing an MR element as a read element, a read signal which is not dependent upon the circumferential speed of the disk-like medium is achieved. The air bearing surface of a head must be designed to ensure that an almost constant flying height is achieved over the entire writing area of the disk-like medium.

Next, due to the structural features of a head, the transducers are located approximately 35 to 50 $\mu$m further inward from the trailing edge. When causing a head structured as described above to fly at an extremely small flying height of 25 nm or less, it is necessary to set an attitude angle (pitch angle) in the direction of the length of the slider during flight smaller than $3\times10^{-4}$ (rad) as a means for preventing contact between the trailing edge of the slider and the disk-like medium. While Japanese Pat. No. 2,573,236 discloses a technology whereby the flying state is stabilized in a range over which the pitch angle is small, it is difficult to maintain a consistent flying height from the inner track to the outer track so that the flying height remains at 25 nm or less since the head disclosed in this patent is a taper flat type head, which, in turn, makes it difficult to prevent problems such as a head crash that occurs when the trailing edge of the slider comes in contact with the disk-like medium.

As a means for achieving a constant flying height, designing a slider as a negative pressure slider that utilizes negative pressure has been considered. Such sliders are disclosed in Japanese Examined Patent Publication No. 1619/1995 and U.S. Pat. No. 4,734,803. However, there are problems with this type of slider, such as dust present inside the magnetic storage device becoming adhered to the indented portion of the negative pressure slider, greatly changing the flying height of the slider and the slider attracting to the surface of the disk-like medium. Thus, in order to put a negative pressure slider into practical use, a slider having a new flying surface that prevents dust from affecting its operation, good flying start characteristics (takeoff characteristics) and in which the attracting phenomenon is avoided, must be developed. Problems caused by dust in the magnetic storage device adhering to the slider are not limited to a negative pressure slider and can occur in other types of sliders as well.

Another crucial requirement is an improvement in the following stability of the slider relative to oscillations of the disk. An air lubricating film formed between the slider and the disk-like medium has a cushioning effect and the slider flies while maintaining a balance between the air lubricating film and the recovering force of the head suspension. When the oscillation frequency of the disk-like medium increases, the following stability of the slider deteriorate due to the inertia of the slider mass. In order to design a slider with good following stability, it is crucial to achieve a high level of air lubricating film stiffness.

Since it is extremely difficult to satisfy the technical objectives and requirements described above with a head or a slider in the prior art, development of a new head is required. Furthermore, an optical disk apparatus which utilizes a near-field read/write system has come to light in recent years since it can break through the limitation of high writing density achieved by magnetic read/write apparatuses. In the optical disk apparatus utilizing a near-field writing and reading system, a flying type slider is employed. Consequently, the same problems explained with relation to the magnetic read/write apparatuses exist and must be addressed.

SUMMARY OF THE INVENTION

It is an object of the present invention to provide a head, a slider, a head apparatus and a read/write apparatus that are extremely effective for achieving high density writing and an increase in the storage capacity.

It is a further object of the present invention to provide a slider and head having an air bearing surface with a new structure.

It is a still further object of the present invention to provide a slider and head with which contact with the disk-like medium is prevented even at a flying height of 25 nm or less.

It is a still further object of the present invention to provide a head, a slider, a head apparatus and a read/write apparatus that achieve a high degree of flying stability against disturbance and vibration even at a flying height of 25 nm or less.

It is a still further object of the present invention to provide a head, a slider, a head apparatus and a read/write apparatus in which the pitch angle while flying can be set at $3\times10^{-4}$ (rad) or less.

It is a still further object of the present invention to provide a smaller and thinner slider and head that achieve outstanding mass productivity.

It is a still further object of the present invention to provide a slider and head that may be achieved through integrated machining that adopts a high accuracy pattern forming technology such as dry etching.

In order to achieve the objects described above, the slider according to the present invention receives dynamic air pressure at a surface facing the medium, which comprises a front flat surface, a first positive pressure generating portion, a second positive pressure generating portion and a first negative pressure generating portion. The front flat surface, which is provided starting at a leading edge, ends at an intermediate point along a lengthwise direction. The first and second positive pressure generating portions have flat surfaces which are essentially of equal heights and are positioned separated from each other over a distance at two sides in a widthwise direction running perpendicular to a lengthwise direction, with edges at one end located toward the leading edge forming step faces rising up from the front flat surface in a step. The first negative pressure generating portion is provided behind the front flat surface relative to the airflow direction and has a base surface with a height which is lower than the height of the front flat surface.

Applied to a head, the transducer is provided toward the trailing edge of the slider. An electromagnetic transducer is used in a magnetic head, and an optical transducer is used in a near-field writing and reading system. In an application in a read/write apparatus, the surface of the head according to the present invention that is located at the opposite side from the surface facing the medium is supported by a head suspension and the surface facing the medium causes the head to fly by dynamic air pressure generated when the disk-like medium rotates. The head according to the present invention should be combined with a disk-like medium with a high degree of surface accuracy with for instance, a surface roughness $Ra \leq 1$ nm when it is to fly at an extremely small flying height of 25 nm or less.

The slider according to the present invention comprises a front flat surface, a first positive pressure generating portion, a second positive pressure generating portion and a first negative pressure generating portion at the surface facing a medium. The first and the second positive pressure generating portions are positioned separated from each other over a distance at two sides in a widthwise direction. The first negative pressure generating portion is positioned between the first and second positive pressure generating portions. As a result, when the disk-like medium is caused to rotate, two lift dynamic pressures caused by the first and second positive pressure generating portions are generated separated from each other over a distance at two sides in a widthwise direction at the leading edge and the first negative pressure caused by the first negative pressure generating portion is positioned between the two lift dynamic pressures.

In addition, since the front flat surface, with a height which is lower than the height of the surface of the first and second positive pressure generating portions and higher than the height of the base surface of the first negative pressure generating portion, is provided between the leading edge and the first and second positive pressure generating portions, high air lubricating film stiffness with a high degree of stability is generated at the surfaces of the first and second positive pressure generating portions, achieving stable following characteristics.

The structure of an air bearing surface that achieves such pressure distribution is new, and it has been confirmed that even at a flying height of 25 nm or less, the flying height is maintained in a stable manner and contact with the disk-like medium is prevented.

In addition, surfaces of the first and second positive pressure generating portions may be set at a specific size, increasing the load capacity at the leading edge. This results in an increase in the air lubricating film stiffness, and consequently, even when ultra low flying at 25 nm or less is achieved, a flying state with a low pitch angle is maintained in a stable manner. Furthermore, since a high air lubricating film stiffness is maintained, the following stability to the surface of the disk-like medium are improved. Thus, even when the flying height is reduced to 25 nm or less, contact between the head and the surface of the disk-like medium at the trailing edge of the slider where the flying height is at its minimum, can be prevented.

Since the first positive pressure generating portion and the second positive pressure generating portion constitute flat surfaces having essentially the same height and are provided at the two sides in the widthwise direction over a distance, stabilization in the roll angle is achieved as well.

Moreover, it has been verified that with the new air bearing surface structure described above, a high degree of flying stability against disturbance and vibration is achieved even at a flying height of 25 nm or less due to the high air lubricating film stiffness.

In addition, with the new air bearing surface structure described above, the pitch angle can be set at $3 \times 10^{-4}$ (rad) or less, and contact between the trailing edge of the slider and the disk-like medium is avoided, even at a flying height of 25 nm or less.

The front edge of the first negative pressure generating portion must be closed viewed from the air flow direction. In this case, the front edge is typically constituted as a step. The height of the step and the size, shape and the like of the surface continuous to the step are selected as appropriate to achieve the required flying characteristics at a flying height of 25 nm or less.

Forming the first positive pressure generating portion and the first negative pressure generating portion and first negative pressure generating portion with steps in this manner achieves advantages in that the flying characteristics described above are achieved and that all these portions can be machined as an integrated unit by employing a high accuracy pattern forming technology such as dry etching.

Thus, according to the present invention, a smaller and thinner head that is extremely effective for achieving high writing density, an increase in storage capacity and achieves outstanding mass productivity is provided. The height of the steps, the area of the top surfaces continuous to the steps and the shape and the like of the the first and second positive pressure generating portions are selected as appropriate to achieve the required flying characteristics at a flying height of 25 nm or less.

As a preferable example of a slider according to the present invention, the surface facing a medium may further include a third positive pressure generating portion. The third positive pressure generating portion is provided toward the trailing edge and has an edge at one end located toward the leading edge which forms a step face rising up from the base surface of the first negative pressure generating portion in a step. With this structure, when the disk-like medium is caused to rotate, along the airflow direction, two lift dynamic pressures caused by the first and second positive pressure generating portions are generated toward the leading edge, a lift dynamic pressure caused by the third positive pressure generating portion is generated and a negative pressure caused by the first negative pressure generating portion is generated between two lift dynamic pressures caused by the first and second positive pressure generating portions and the lift dynamic pressure caused by the third positive pressure generating portion. The air bearing surface structure that achieves such pressure distribution described above is new, and it has been confirmed that even at a flying height of 25 nm or less, contact with the disk-like medium is prevented.

As another preferable example of a slider or a head according to the present invention, the surface facing a medium may further include a fourth positive pressure generating portion and a fifth positive pressure generating portion. The fourth positive pressure generating portion is located behind the first positive pressure generating portion over a distance in the lengthwise direction and is provided with an edge at one end located toward the leading edge. The fifth positive pressure generating portion is located behind the second positive pressure generating portion over a distance in the lengthwise direction and is provided with an edge at one end located toward the leading edge. With this structure, since the two positive air bearings constituted by the fourth positive pressure generating portion and the fifth positive pressure generating portion are formed, the load capacity increases at the leading edge. This results in an increase in the air lubricating film stiffness, thereby improving the following stability relative to the surface of the disk-like medium. When the fourth and fifth positive pressure generating portions are provided, the surface facing a medium may further include a second negative pressure generating portion and a third negative pressure generating portion. The second negative pressure generating portion is formed between the first positive pressure generating portion and the fourth positive pressure generating portion. The third negative pressure generating portion is formed between the second positive pressure generating portion and the fifth positive pressure generating portion.

With the structure described above, when the disk-like medium rotates, a series of air bearings constituted of the first positive pressure generating portion, the second negative pressure generating portion and the fourth positive pressure generating portion, and a series of air bearings constituted of the second positive pressure generating portion, the third negative pressure generating portion and the fifth positive pressure generating portion are formed parallel to each other at the two sides of the slider in its widthwise direction.

Furthermore, the first negative pressure due to the first negative pressure generating portion is generated inside an area enclosed by the first positive pressure generating portion, the second positive pressure generating portion, the second negative pressure generating portion, the third negative pressure generating portion, the fourth positive pressure generating portion and the fifth positive pressure generating portion.

A head that achieves such pressure distribution is new, and it has been confirmed that even at a flying distance of 25 nm or less, a stable attitude is maintained so as to prevent contact with the disk-like medium.

Moreover, by providing the first positive pressure generating portion, the second positive pressure generating portion, the fourth positive pressure generating portion and the fifth positive pressure generating portion toward the four corners of the slider, a high air lubricating film stiffness is achieved in the four corners to improve the following stability.

In addition, since the first and second positive pressure generating portions increase the load capacity toward the leading edge to increase air lubricating film stiffness, a small pitch angle is achieved in a state of extremely low flying of 25 nm or less and the small pitch angle is maintained stable to further improve the following of the head. With the head having the new structure described above, the pitch angle may be set small, at $3.0 \times 10^{-4}$ (rad) or less. It has also been confirmed that since a high degree of air lubricating film stiffness is achieved, contact between the trailing edge of the slider and the disk-like medium can be avoided even at a flying distance of 25 nm or less.

Moreover, it has been confirmed that with the head having the new structure described above, a stable small flying height of 25 nm or less is assured, by minimizing the fluctuations in the flying height caused by disturbance, oscillation of the disk-like medium and dust.

Furthermore, the positive pressure generating portions and the negative pressure generating portions are formed through integrated machining by employing a high accuracy pattern forming technology such as dry etching on the surface of the slider facing the medium.

Consequently, according to the present invention, a smaller, thinner head that is extremely effective for achieving a higher writing density, an increase in the storage capacity and demonstrates outstanding mass productivity is provided.

In one desirable mode, the second and third negative pressure generating portions are each constituted of an indented portion dropping down from the surfaces of the first and second positive pressure generating portions. The fourth and fifth positive pressure generating portions rise up from one of the surfaces of the indented portions.

It is desirable to form the surfaces of the indented portions constituting the second and third negative pressure generating portions so as to narrow starting from the side of the leading edge to the central portion and so as to widen starting from the central portion toward the side of the trailing edge. With this structure, the roll characteristics are improved.

In the embodiment including the fourth and fifth positive pressure generating portions and the second and third negative pressure generating portions, the third positive pressure generating portion described above may be included. The third positive pressure generating portion is provided toward the trailing edge and has an edge at one end located toward the leading edge and rises up from the base surface of the first negative pressure generating portion in a step. The transducer will be mounted at the center of the third positive pressure generating portion. This structure, when adopted in a read/write apparatus, achieves the flying characteristics that will be less influenced by fluctuations in the roll angle over the entire surface of the disk-like medium.

The first and second positive pressure generating portions may be oriented in the widthwise direction of the slider assuming a structure in which the first and second positive pressure generating portions are continuous to form a single flat surface being an air bearing surface. In this case, since the load capacity at the side of the leading edge becomes further increased to increase air lubricating film stiffness, a small pitch angle is maintained in a stable manner at a very low flying height of 25 nm or less and the following stability of the head are also improved.

The first and second positive pressure generating portions may be provided extending toward the trailing edge of the slider with the electromagnetic transducer mounted at least at either the first positive pressure generating portion or the second positive pressure generating portion.

The slider in the head according to the present invention should preferably have a length of 1.25 mm and a width of 1.0 mm or less and should weigh 1.6 mg or less.

In addition, it is desirable to form the surface of the slider facing the medium in such a manner that it achieves symmetry relative to the central axis of the slider running through the lengthwise direction. This structure makes it possible to form the air bearing steps through integrated machining by employing a micro fabrication method such as dry etching without having to perform mechanical machining, thereby facilitating dimensional management in mass production machining and improving mass productivity.

The boundaries between the surfaces of the first, second, fourth and fifth positive pressure generating portions and the surfaces of the indented portions should be formed as a step with the depth of 0.1 μm or more. In addition, the end edges that define the surface of each of the first, second, fourth and fifth positive pressure generating portions and the indented portions are straight lines, curved lines or a combination thereof.

BRIEF DESCRIPTION OF THE DRAWINGS

More specific features and advantages of the present invention are explained in further detail in reference to the drawings, wherein:

FIG. 51 shows data with respect to the relationship between the position of the slider and the flying height achieved in a read/write apparatus employing the heads shown in FIGS. 39, 43 and 47.

FIG. 52 shows data with respect to the relationship between the position of the slider and the pitch angle achieved in a read/write apparatus employing the heads shown in FIGS. 39, 43 and 47.

DETAILED DESCRIPTION OF THE PREFERRED EMBODIMENTS

Figure 1:
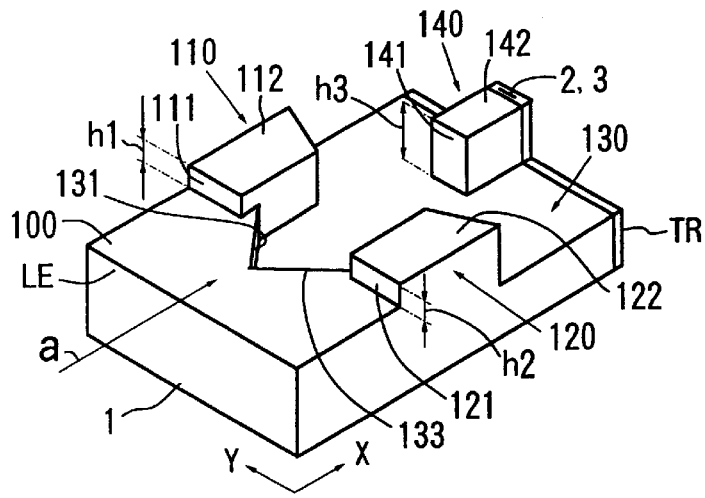
FIG. 1 illustrates a perspective of a first embodiment of the head according to the present invention.
Figure 2:
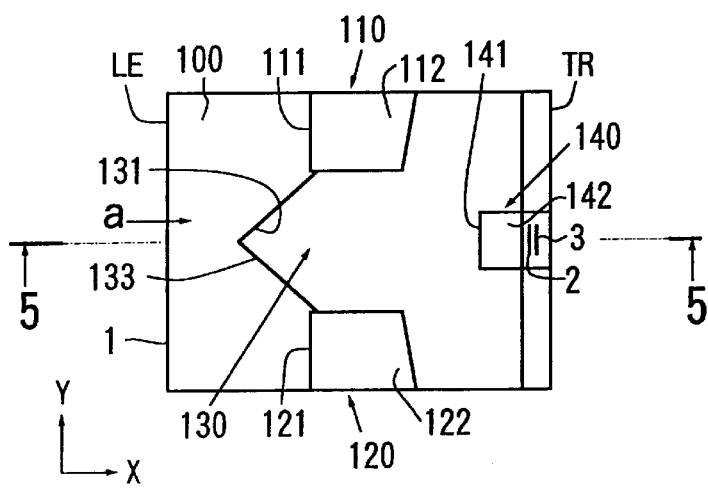
FIG. 2 illustrates a plan view of the head in FIG. 1 viewed from the side where the surface facing the medium is located.
Figure 3:
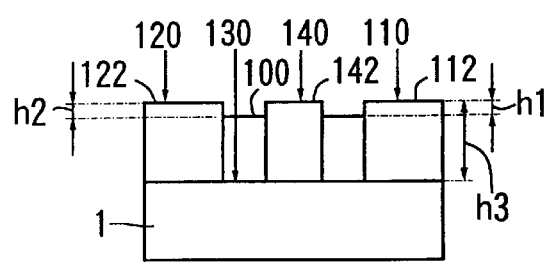
FIG. 3 illustrates a front view of the head shown in FIG. 2.
Figure 4:
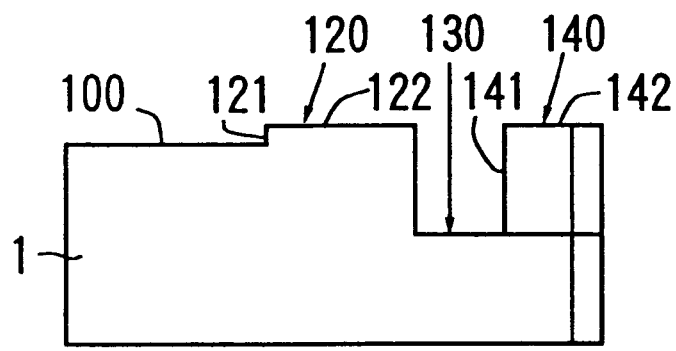
FIG. 4 illustrates a side elevation of the head shown in FIG. 2.
Figure 5:
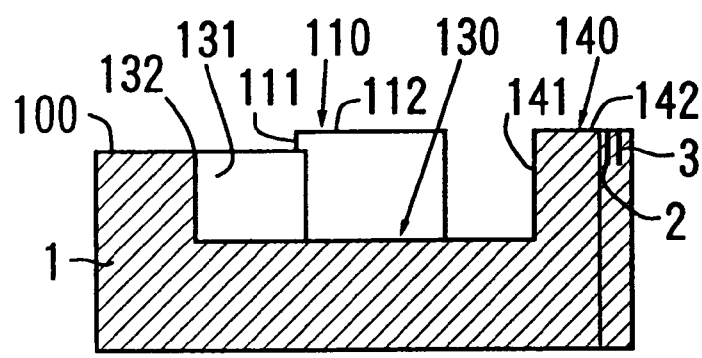
FIG. 5 illustrates a cross section along line 5—5 in FIG. 2.

Referring to FIGS. 1 to 5 which show a first embodiment, the head according to the present invention comprises a slider 1 and transducers 2 and 3. The transducers 2 and 3 constitute two elements, i.e. a writing element and a reading element. The slider 1 is provided with a front flat surface 100, a first positive pressure generating portion 110, a second positive pressure generating portion 120, and a first negative pressure generating portion 130. The front flat surface 100, which is provided starting at a leading edge LE, continues on to an intermediate point along a lengthwise direction X. The first positive pressure generating portion 110 and the second positive pressure generating portion 120 have top surfaces 112 and 122 which constitute flat surfaces having essentially equal heights and are positioned separated from each other over a distance at two sides in a widthwise direction Y running perpendicular to the lengthwise direction X. The first and the second positive pressure generating portions 110 and 120 each include an edge at one end located toward the leading edge LE forming step faces 111 and 121 which rise up from the front flat surface 100 in a step. The first negative pressure generating portion 130 is provided behind the front flat surface 100 relative to the airflow direction indicated with arrow (a) and has a base surface which is lower than the top surface of said front flat surface 100 and has a front edge 133 located toward the leading edge LE forming a rising step face 131 to constitute a first negative pressure generating portion. The first negative pressure generating portion 130 drops down from the end edge of the front flat surface 100 and continues on to the trailing edge TR.

The front edge 133 of the front flat surface 100 viewed from airflow direction (a) must be closed. In this case, the front edge 133 is typically constituted as the step face 131. The height of the step and the size, shape and the like of the surface are selected as appropriate to achieve the required flying characteristics at a flying height of 25 nm or less. More specifically, the height of the step may be set at approximately 2.5 $\mu$m. It is desirable to set the length, the width and the weight of the slider 1 at 1.25 mm or less, 1.00 mm or less and 1.6 mg or less respectively. The transducers 2 and 3 are provided at the trailing edge TR of the slider 1.

In the head in this first embodiment, the surface facing a medium further includes a third positive pressure generating portion 140 which is provided toward the trailing edge TR and has a step face 141 facing the leading edge LE which rises up from the base surface of the first negative pressure generating portion 130. The third positive pressure generating portion 140 is located at approximately the central portion in the widthwise direction Y with another end thereof continuing on to said trailing edge TR. The transducers 2 and 3 are mounted on the third positive pressure generating portion 140. The first, second and third positive pressure generating portions 110, 120 and 140 are all positioned symmetrically relative to the central axis running in the lengthwise direction X.

The heights h1, h2 and h3 of the step faces 111, 121 and 141 respectively and the sizes and shapes of the first, second and third positive pressure generating portions 110, 120 and 140 are selected as appropriate to achieve the required flying characteristics at a flying height of 25 nm or less. More specifically, the heights h1 and h2 of the step faces 111 and 121 are set within a range of 0.1 to 1.0 μm.

The advantages achieved by constituting the first and second positive pressure generating portions 110 and 120, the first negative pressure generating portion 130 and the third positive pressure generating portion 140 with steps, include assurance of the required flying characteristics and integrated machining that can be implemented by employing a high accuracy pattern forming technology such as dry etching.

The end edges defining each of the flat surfaces of the first, second and third positive pressure generating portions 110, 120 and 140 are straight lines, curved lines or a combination thereof.

Figure 6:
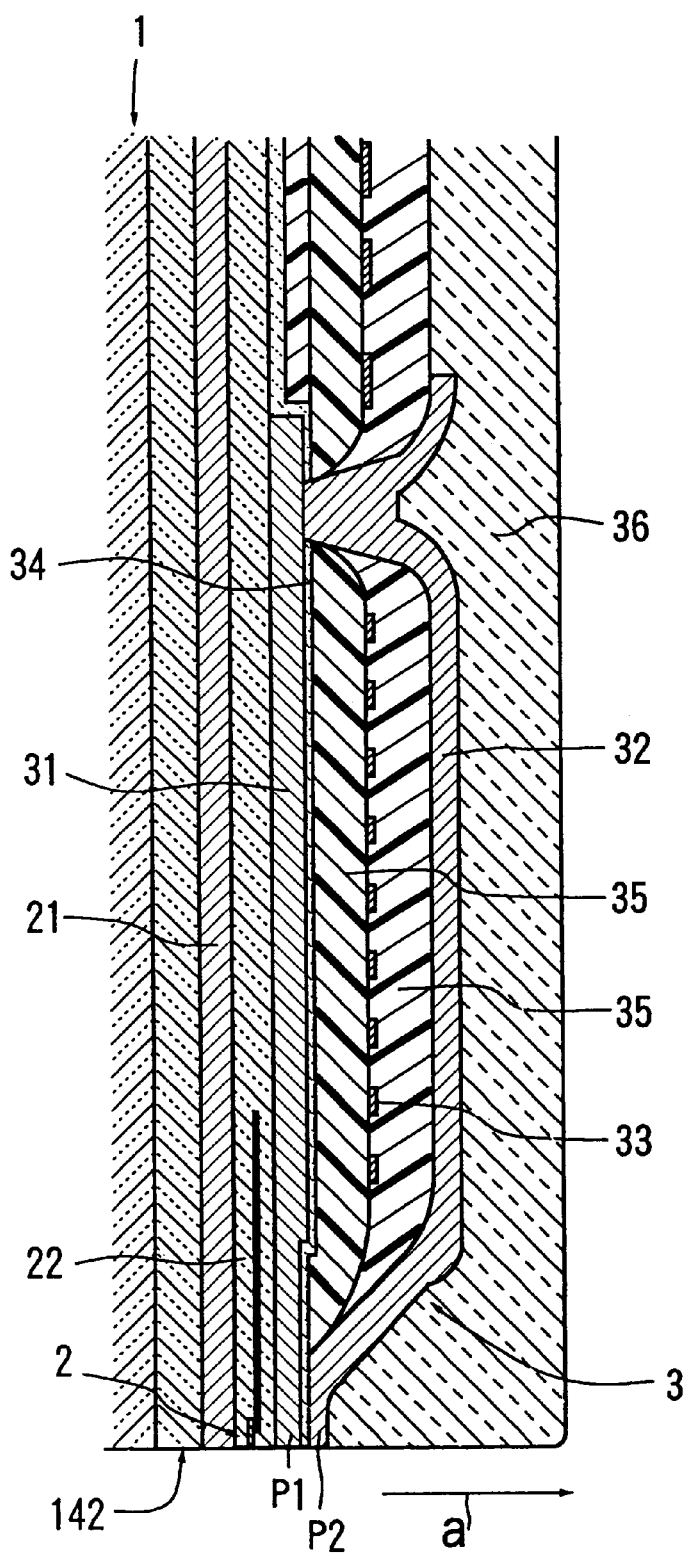
FIG. 6 illustrates an enlarged cross section of the head shown in FIGS. 1 to 5, where the electromagnetic transducers are provided.

FIG. 6 is an enlarged cross section illustrating the portion of the transducer shown in FIGS. 1 to 5. The transducer 3, which constitutes a write element, is an inductive thin film transducer, whereas the transducer 2, which constitutes a read element, is an MR element.

The transducer 3, which constitutes the write element, is provided with a first magnetic film 31 that also functions as a second shield film for the MR element 2, a second magnetic film 32, a coil film 33, a gap film 34 that may be constituted of alumina or the like, an insulating film 35 constituted of an organic resin, and a protective film 36 constituted of alumina or the like. The front end portions of the first magnetic film 31 and the second magnetic film 32 constitute a first pole tip P1 and a second pole tip P2 which face each other over the gap film 34, whose thickness is very small, and write is performed at the first pole tip P1 and the second pole tip P2. The yokes of the first magnetic film 31 and the second magnetic film 32 are linked with each other at the back gap which is on the opposite side from the first pole tip P1 and the second pole tip P2 so that they complete a magnetic circuit. The coil film 33 is formed on the insulating film 35 in such a manner that it winds around the linking portion of the yokes in a coil. The number of windings and the number of layers in the coil film 33 are arbitrary.

There are various film structures which have been proposed and put into practical use to date, any one of which may be adopted to constitute the MR element 2. For instance, the MR element 2 may be constituted of an anisotropic magnetoresistive element achieved by using a permalloy or the like or it may employ a giant magnetoresistive (GMR) film. Any one of the above mentioned types of elements may be adopted in the present invention. The MR element 2 is located inside an insulating film 22 between a first shield film 21 and the first magnetic film 31 which also functions as the second shield film. The insulating film 22 is constituted of alumina or the like. Unlike in the embodiment, only the transducer 3 may be provided to be used as a read/write element.

In an application in a read/write apparatus, the surface of the head according to the present invention that is located at the opposite side from the surface facing the medium is supported by a head suspension and the head is caused to fly by air current generated between the surface facing the medium and the surface of the medium when the disk-like medium rotates. The head according to the present invention should be combined with a disk-like medium with a high degree of surface accuracy when it is to fly at an extremely small flying height of 25 nm or less.

Figure 7:
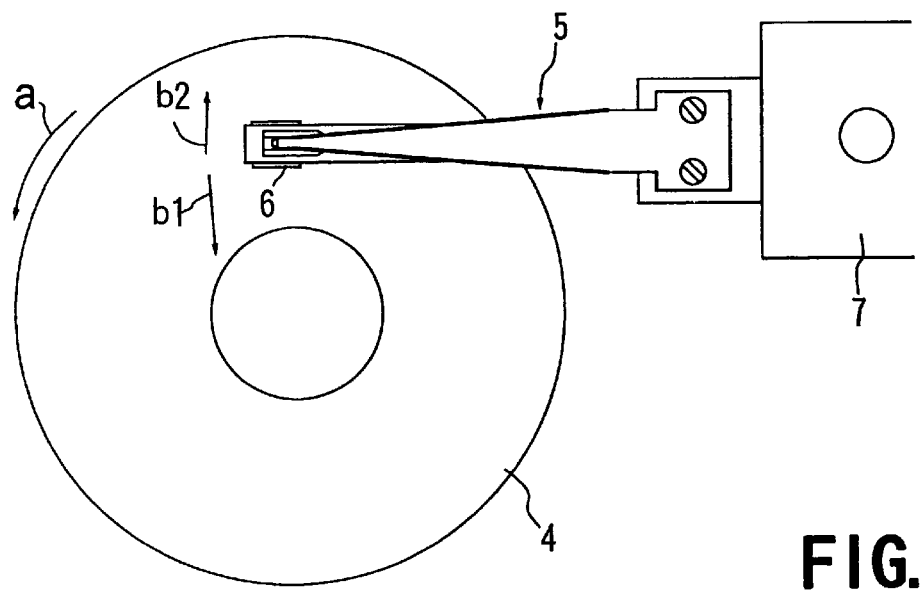
FIG. 7 illustrates a magnetic read/write apparatus according to the present invention.

FIG. 7 shows the read/write apparatus according to the present invention. The magnetic read/write apparatus according to the present invention comprises a disk-like medium 4, a head suspension 5 of the known art, a head 6 according to the present invention and a positioning device 7. The disk-like medium 4 is driven to rotate in the direction indicated by the arrow (a) by a rotating drive mechanism (not shown). The positioning device 7, which employs a rotary actuator system, supports the head suspension 5 at one end and drives it in the directions indicated by the arrows b1 and b2 at a specific angle (skew angle) on the plane of the disk-like medium 4. With this, writes to and reads from the disk-like medium 4 are performed at specific tracks. The head 6 is mounted to the free end of the head suspension 5 in such a manner that pitch movement and roll movement are allowed and that a load is applied in the direction of the plane of the disk-like medium 4.

Figure 8:
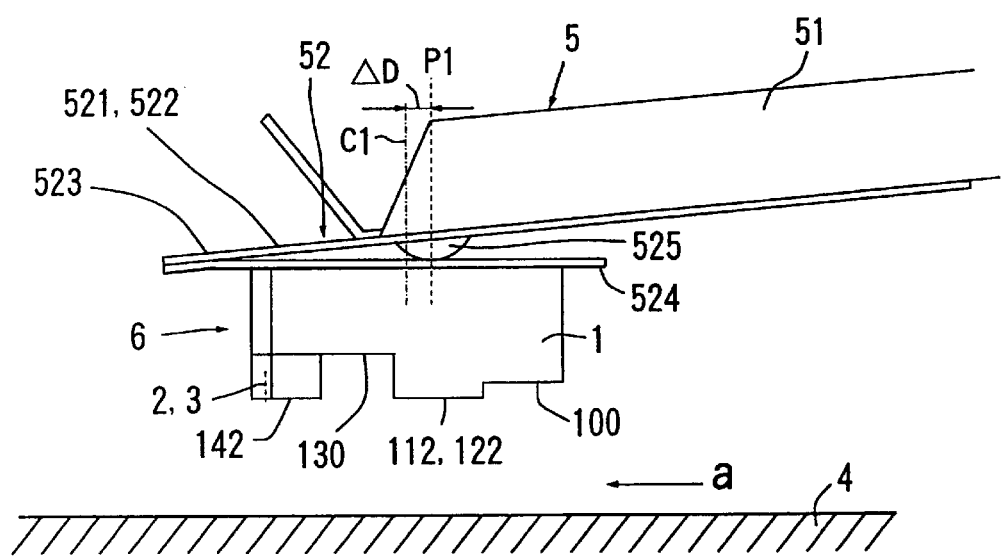
FIG. 8 illustrates a side elevation of the magnetic head device adopted in the magnetic read/write apparatus shown in FIG. 7.

FIG. 8 is a side elevation view of the head device. The head suspension 5 is constituted by mounting a flexible body 52 constituted of thin metal plate at a free end located at one end in the lengthwise direction of a supporting body 51 which is likewise constituted of thin metal plate and mounting the head 6 at the lower surface of the flexible body 52. The head suspension 5 applies a load force to the head 6 to press it toward the disk-like medium 4. The flexible body 52 in the figure is provided with two outer frame portions 521 and 522 extending almost parallel to the axis of the supporting body 51 in its lengthwise direction, a lateral frame 523 that links the outer frame portions 521 and 522 at an end which is distanced from the supporting body 51, and a tongue piece 524 extending from approximately the center of the lateral frame 523 almost parallel to the outer frame portions 521 and 522 with its front end being a free end. One end of the flexible body 52 that is at the opposite side from where the lateral frame 523 is provided is mounted in the vicinity of the free end of the supporting body 51 by means such as welding.

At the lower surface of the supporting body 51, a projection for load 525 is provided, which may take, for instance, a semi-spherical form. With this projection for load 525, a load force is communicated from the free end of the supporting body 51 to the tongue piece 524. Load point P1 of the head 6 at the projection for load 525 is offset by an offset ΔD toward the inflow end from the center of gravity C1 of the head 6. Note that the projection for load 525 may be provided in such a manner that the load point P1 of the head 6 at the projection for load 525 is set at the position of the center of gravity C1.

The head 6 is mounted at the lower surface of the tongue piece 524 by means such as bonding. The head 6 is mounted to the head suspension 5 so that its lengthwise direction is aligned to the lengthwise direction of the head suspension 5. The head suspension 5 that may be adopted in the present invention is not limited to that employed in the first embodiment. Selection may be made from a wide variety of head suspensions that have been proposed to date and head suspensions that will be proposed in the future. For instance, the supporting body 51 and the tongue piece 524 may be integrated by employing the technology disclosed in Japanese Unexamined Patent Publication No. 215513/1994 or by using a flexible high polymer wiring board such as tab tape (TAB).

Figure 9:
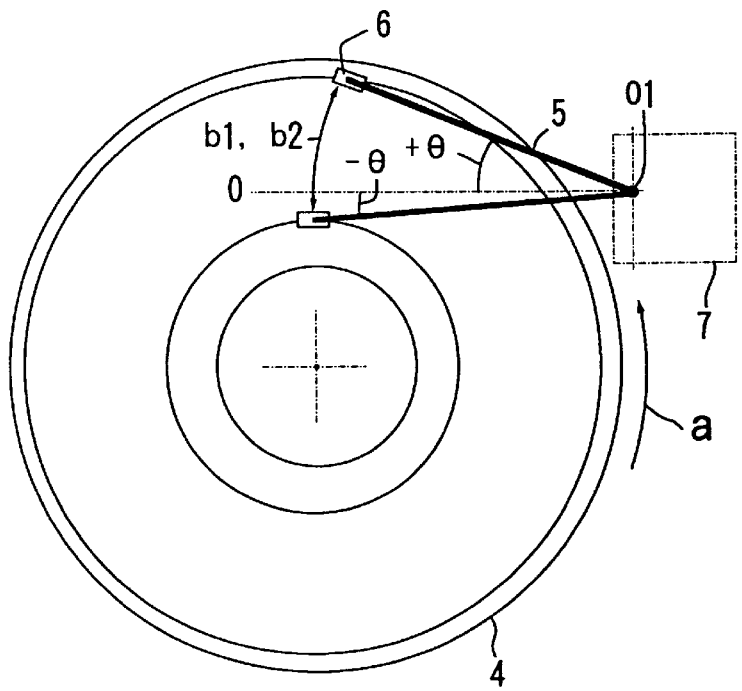
FIG. 9 illustrates the operation of the magnetic read/write apparatus shown in FIG. 7.

FIG. 9 illustrates the operation of the read/write apparatus shown in FIGS. 7 and 8. During a read/write operation, the head suspension 5 that supports the head 6 is driven to swing in the directions indicated by the arrows b1 and b2 around the pivot center O1 by the positioning device 7 employing a rotary actuator method. The position of the head 6 on the disk-like medium 4 is normally expressed as a skew angle θ. In the description of the present invention, the skew angle θ is expressed as the inclination of the central line of the slider 1 in the widthwise direction W.

Figure 10:
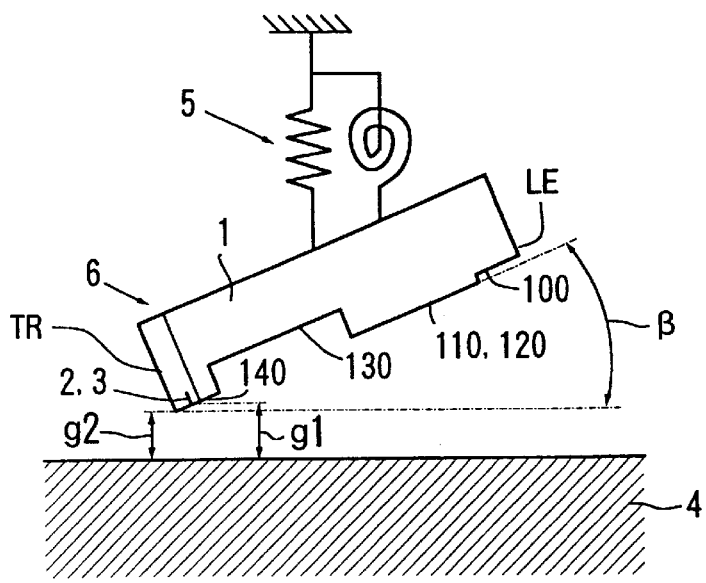
FIG. 10 illustrates a model of the magnetic read/write apparatus shown in FIG. 7.

FIG. 10 presents a model of the magnetic read/write apparatus shown in FIGS. 7 and 8. The head 6 generates lift dynamic pressure at the first, second and third positive pressure generating portions 110, 120 and 140 against which a spring load is applied by the head suspension 5, and a negative pressure is generated by the first negative pressure generating portion 130 between the first, second and third positive pressure generating portions 110, 120 and 140. The head 6 flies at a very small flying height g1 and at a pitch angle β at which the spring load, the lift dynamic pressure and the negative pressure are in balance. The flying height g1 represents the flying height of the transducers 2 and 3 and should be distinguished from the flying height g2 formed between the trailing edge TR and the disk-like medium 4.

Next, in reference to measured data, advantages that are achieved by the magnetic read/write apparatus employing the head according to the present invention are explained. The specifications of the head 6, the head suspension 5 and the disk-like medium 4 are as follows.

Figure 11:
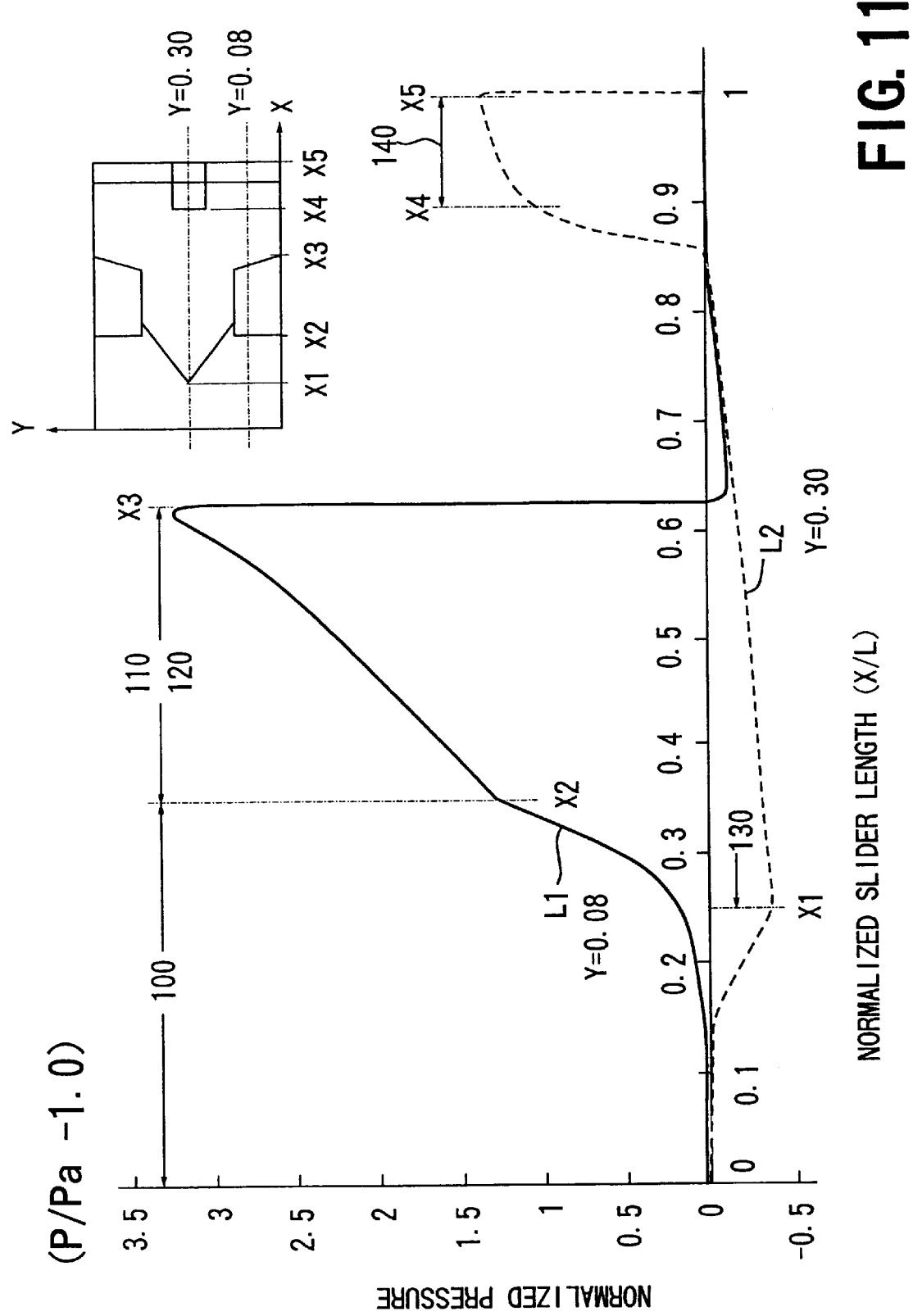
FIG. 11 shows data with respect to the relationship between the normalized slider length and the normalized pressure in the magnetic read/write apparatus employing the head illustrated in FIGS. 1 to 5.

(slider 1)
length: 0.8 mm
width: 0.6 mm
thickness: 0.3 mm
weight: 0.6 mg
(head suspension 5)
load force: 1.0 gf
spring rate: 1.8 gf/mm
load point: central area of the slider 1
(disk-like medium 4)
disk diameter: 2.5 inches
disk rotational speed: 7200 rpm FIG. 11 shows data with respect to the relationship between the normalized slider length and the normalized pressure. The normalized slider length which is represented by the horizontal axis is expressed as the ratio (x/L) of the position x taken in the lengthwise direction from the leading edge LE and the entire length L of the slider 1. The normalized pressure represented by the vertical axis is determined by using a formula (P/Pa−1) with P being the pressure applied to the slider 1 and Pa being the atmospheric pressure. The curve L1 represents the pressure distribution achieved at a position distanced by y=0.08 mm from one end edge of the slider 1 in the widthwise direction W, whereas the curve L2 represents the pressure distribution characteristics achieved at a position distanced by y=0.30 mm.

Figure 12:
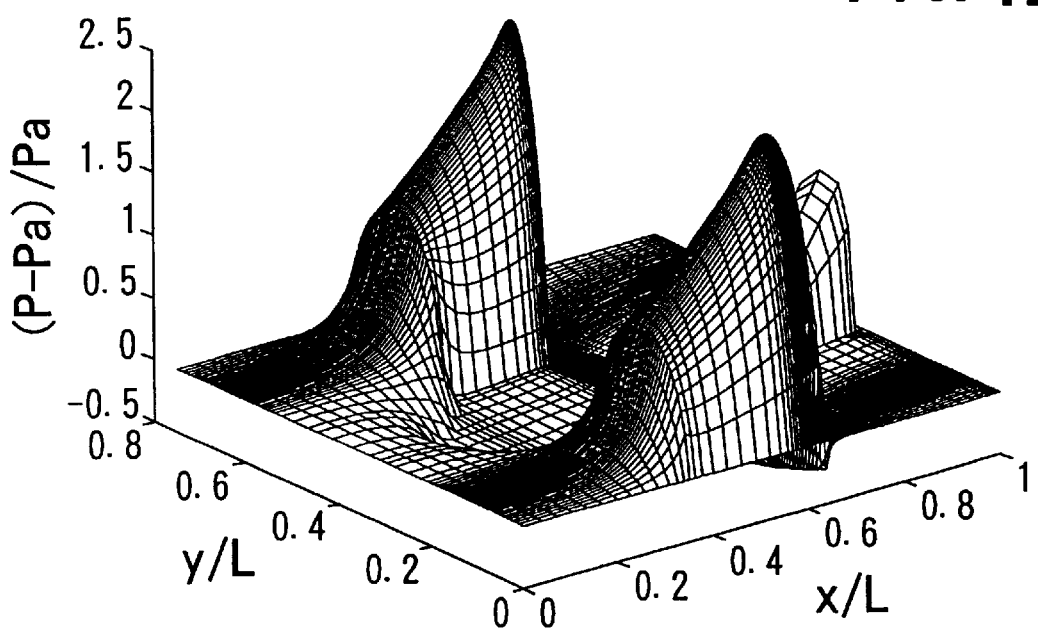
FIG. 12 shows three-dimensional data with respect to the relationship between the normalized slider length and the normalized pressure in the magnetic read/write apparatus employing the head illustrated in FIGS. 1 to 5.

FIG. 12 shows computer simulated data that illustrate three dimensionally the relationship between the normalized slider length and the normalized pressure shown in FIG. 11.

In the head according to the present invention, the surface facing a medium is provided with first and second positive pressure generating portions 110 and 120, a first negative pressure generating portion 130 and a third positive pressure generating portion 140, with the first negative pressure generating portion 130 located between the first, second and third positive pressure generating portions 110, 120 and 140. Thus, as FIGS. 11 and 12 clearly demonstrate, when the disk-like medium 4 is caused to rotate, first lift dynamic pressures are generated by the first and second positive pressure generating portions 110 and 120 along the airflow direction (a), a second lift dynamic pressure is generated by the third positive pressure generating portion 140 at the trailing edge TR (see the characteristics L1) and a negative pressure is generated by the first negative pressure generating portion 130 in the area between the first lift dynamic pressures and the second lift dynamic pressure (see the characteristics L2). The structure of the air bearing surface that achieves such pressure distribution is new, and contact with the disk-like medium can be avoided even at a flying height of 25 nm or less.

Figure 13:
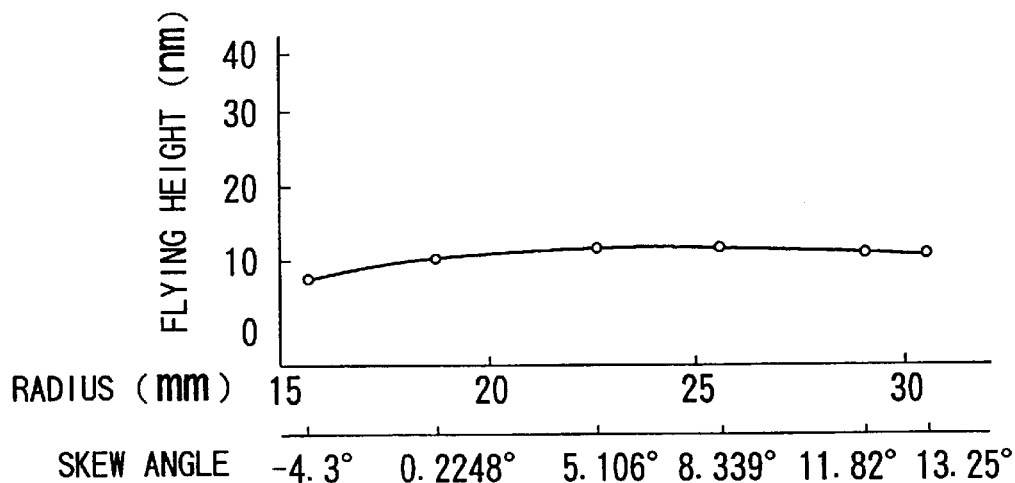
FIG. 13 shows data with respect to the relationship between the position of the slider and the flying height in the magnetic read/write apparatus employing the head illustrated in FIGS. 1 to 5.

FIG. 13 presents data that illustrate the relationship between the position of the slider and the flying height. The position of the slider is illustrated by both the radius of the medium and the skew angle. An explanation of the skew angle has already been given in reference to FIG. 9. FIG. 13 shows the rotating radius of the disk-like medium 4 under the skew angle. As FIG. 13 illustrates, with the head having the new air bearing surface structure described above, a very small flying height g1 of approximately 10 nm is assured over a wide skew angle range (−4.3 to 13.25°). Furthermore, a high degree of flying stability against disturbance and vibration is achieved over a wide skew angle range (−4.3 to 13.25°).

Figure 14:
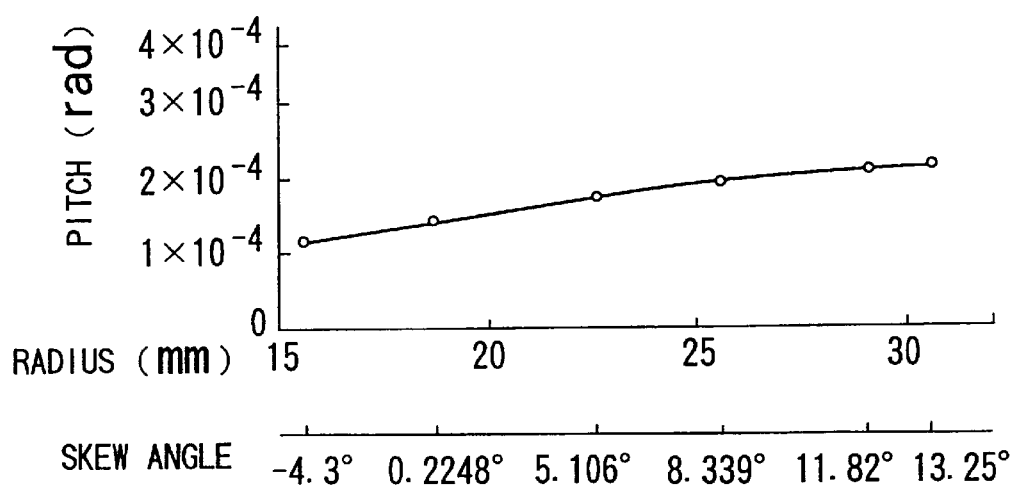
FIG. 14 shows data with respect to the relationship between the position of the slider and the pitch angle in the magnetic read/write apparatus employing the head illustrated in FIGS. 1 to 5.

FIG. 14 presents data that illustrate the relationship between the position of the slider and the pitch angle. The position of the slider is illustrated by both the radius of the medium and the skew angle. As demonstrated in FIG. 14, with the head having the new air bearing surface structure according to the present invention, the pitch angle can be set at $3\times10^{-4}$ (rad) or less, and contact between the trailing edge TR of the slider 1 and the disk-like medium 4 can be prevented even at a flying height g1 of 25 nm or less.

Moreover, the first, second and third positive pressure generating portions 110, 120 and 140, and the first negative pressure generating portion 130 can be formed through integrated machining by employing a high accuracy pattern forming technology such as dry etching on the surface of the slider 1 that faces opposite the medium.

Consequently, according to the present invention, a smaller, thinner head that is extremely effective for achieving higher density magnetic writing and an increase in storage capacity and demonstrates outstanding mass productivity is provided.

Furthermore, as FIGS. 1 to 5 clearly show, the head according to the present invention is not provided with a narrowing shape at the leading edge LE. Thus, the pitch angle can be set small. In addition, since the length of the surfaces 112 and 122 is small, the flying height can be reduced with the lift force set small, and at the same time, the range over which the positive pressure changes in correspondence to the disk rotating speed and air inflow direction is reduced, thereby making it possible to maintain the flying stability of the slider 1. To sum up the information given above, a head and a read/write apparatus that demonstrate the following characteristics:

flying height: 8 to 12 nm
$1.1\times10^{-4}$ (rad)<pitch angle β<$2.2\times10^{-4}$ (rad) are achieved.

Figure 15:
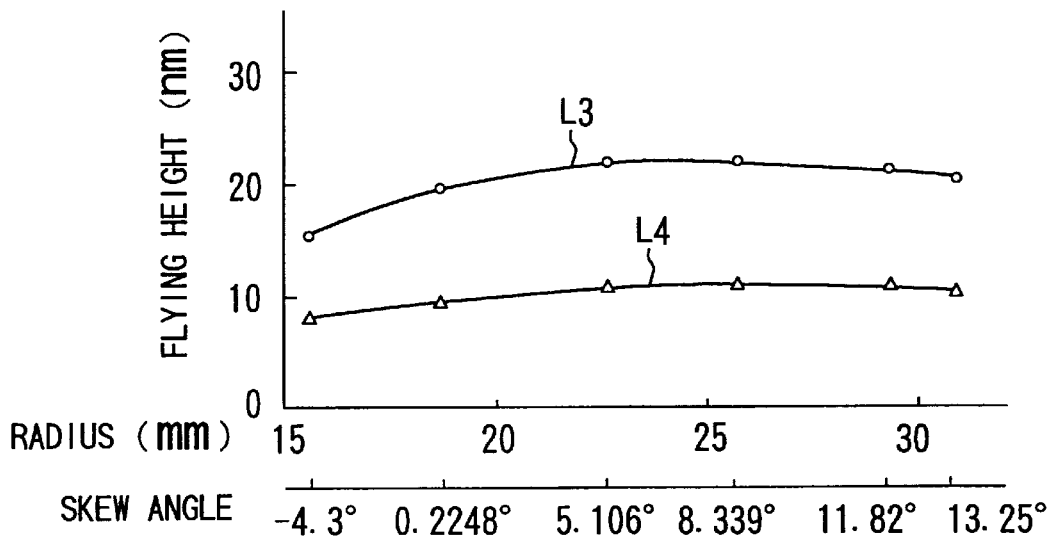
FIG. 15 shows data with respect to the relationship between the position of the slider and the flying height achieved as the heights of the step faces in the head are varied in the magnetic read/write apparatus employing the head illustrated in FIGS. 1 to 5.

FIG. 15 shows data with respect to the relationship between the position of the slider and the flying height g1 as the heights h1 and h2 of the step faces 111 and 121 are varied. The position of the slider is illustrated by both the radius of the medium and the skew angle. The curve L3 represents the characteristics achieved when the heights h1 and h2 are set at 0.6 μm whereas the curve L4 represents the characteristics achieved when the heights h1 and h2 are set at 0.8 μm. The data indicate that by controlling the heights h1 and h2 of the step faces 111 and 121, the flying height g1 can be controlled. When the heights h1 and h2 are smaller than 0.6 μm, it becomes difficult to keep the flying height g1 at 25 nm or less. As the heights h1 and h2 increase, the flying height g1 becomes reduced. However, when they exceed 1.0 μm, the trailing edge TR of the surface 142 of the third positive pressure generating portion 140 (see FIGS. 1 to 5) comes in contact with the disk-like medium 4.

Figure 16:
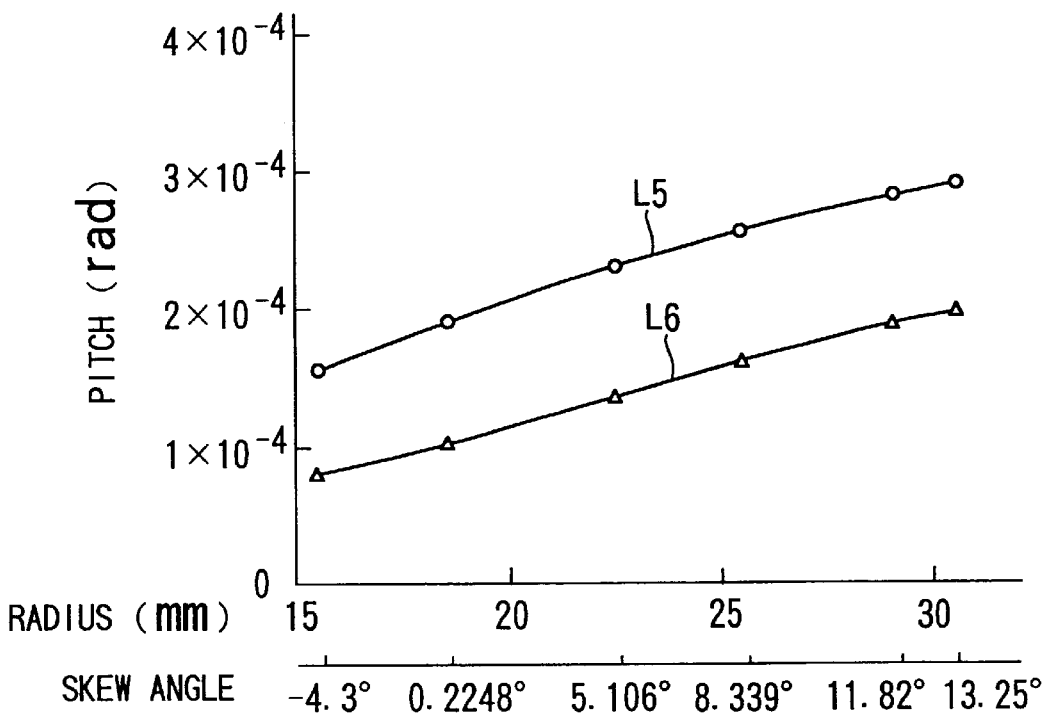
FIG. 16 shows data with respect to the relationship between the position of the slider and the pitch angle achieved as the heights of the step faces in the head are varied in the magnetic read/write apparatus employing the head illustrated in FIGS. 1 to 5.

FIG. 16 shows data with respect to the relationship between the position of the slider and the pitch angle as the heights h1 and h2 of the step faces 111 and 121 are varied. The position of the slider is illustrated by both the radius of the medium and the skew angle. The curve L5 represents the characteristics achieved when the heights h1 and h2 are set at 0.6 μm whereas the curve L6 represents the characteristics achieved when the heights h1 and h2 are set at 0.8 μm. The data indicate that by controlling the heights h1 and h2 of the step faces 111 and 121, the pitch angle can be controlled. When the heights h1 and h2 are smaller than 0.6 μm, it becomes difficult to keep the pitch angle at $3 \times 10^{-4}$ (rad) or less in a range over which the skew angle is large (for instance, at 13.25°). When the heights h1 and h2 are larger than 0.8 μm, the pitch angle becomes equal to or less than $1 \times 10^{-4}$ (rad) in the range over which the skew angle is small (for instance, at 0°), thereby increasing the risk of contact occurring at the leading edge, and when the heights h1 and h2 exceed 1 μm, contact results. To sum up the information given above, it is desirable to set the heights h1 and h2 of the step faces 111 and 121 within the range of 0.6 to 1.0 μm.

Figure 17:
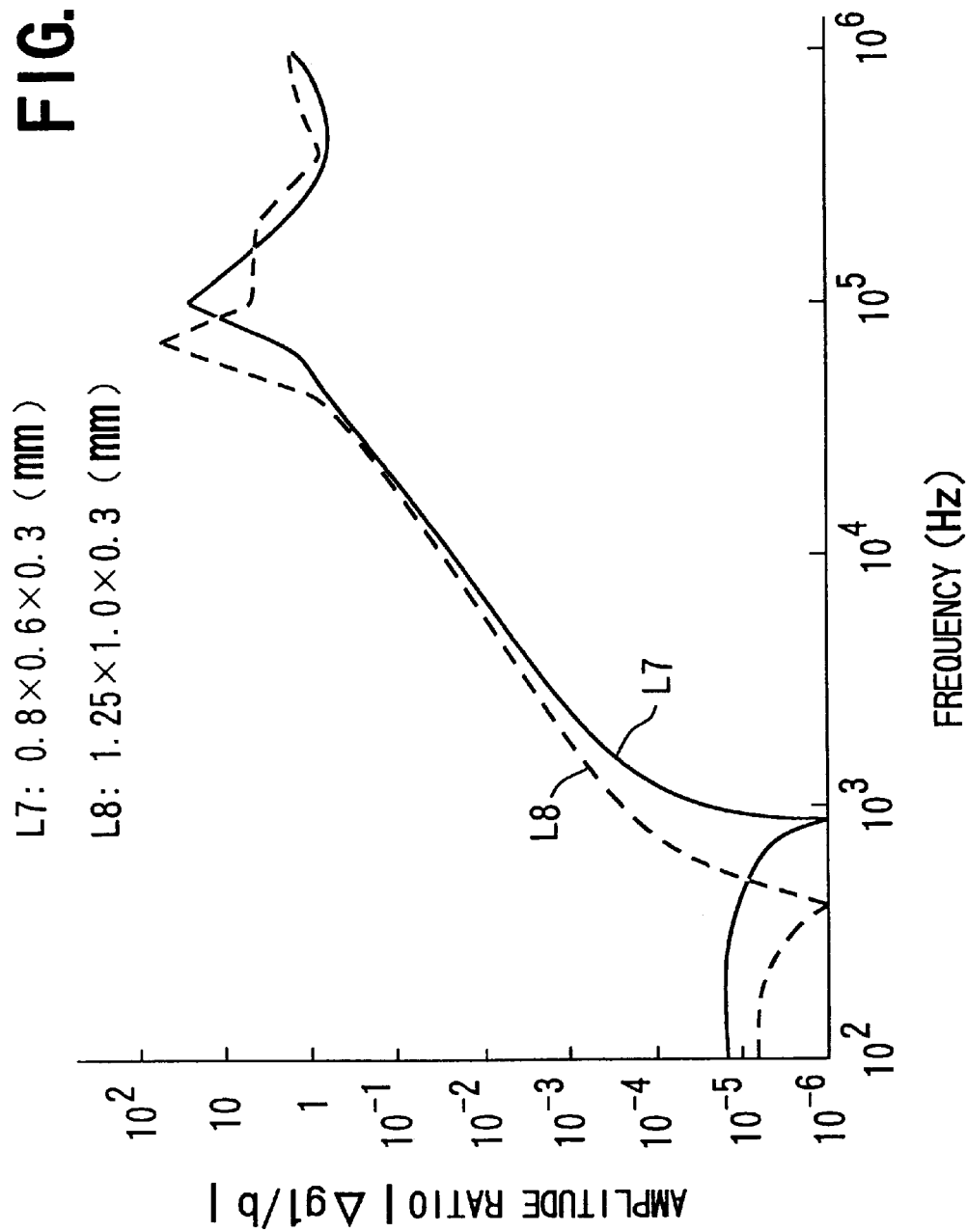
FIG. 17 shows data with respect to the flying height fluctuation due to the parallel motion of the surface of the disk-like medium in the magnetic read/write apparatus employing the head illustrated in FIGS. 1 to 5.

FIG. 17 shows data with respect to the flying height fluctuation due to the parallel motion of the surface of the disk-like medium. In FIG. 17, the horizontal axis represents the frequency (Hz) of the vertical surface motion of the disk-like medium and the vertical axis represents the amplitude ratio (Δ g1/b). Δ g1 indicates the value of fluctuation of the flying height g1, whereas b indicates the value of the disk-like medium oscillation amplitude. The curve L7 represents the characteristics achieved when a slider having dimensions of 0.8 mm in length, 0.6 mm in width and 0.3 mm in height is used, whereas the curve L8 represents the characteristics achieved when a slider having dimensions of 1.25 mm in length, 1.0 mm in width and 0.3 mm in height is used. The flying height g1 is set at 25 nm.

When the slider 1 is miniaturized, while the air lubricating film stiffness is reduced, the following stability relative to parallel oscillations of the disk-like medium do not deteriorate, as shown in FIG. 17, since the slider mass is reduced. The slider 1 having a length of 1.25 mm or less and a width of 1.00 mm or less and weighing 1.6 mg or less achieves good following stability, as illustrated in FIG. 17, independent of the dimensions.

Figure 18:
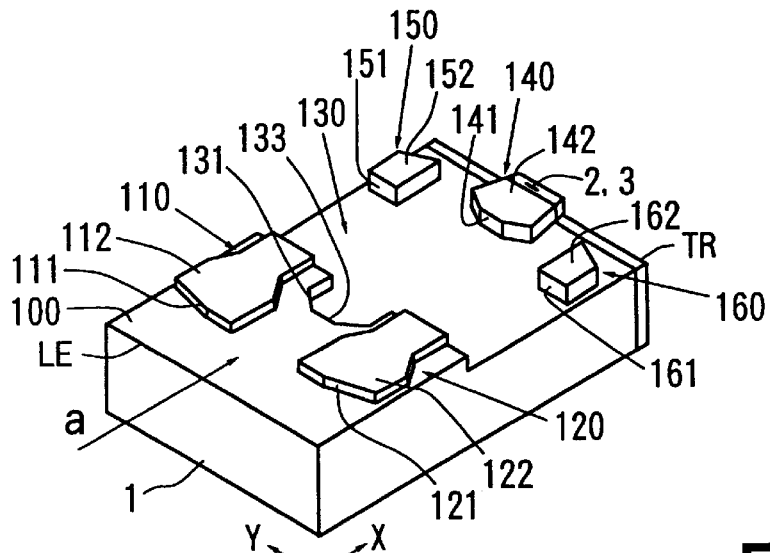
FIG. 18 illustrates a perspective of a second embodiment of the head according to the present invention.
Figure 19:
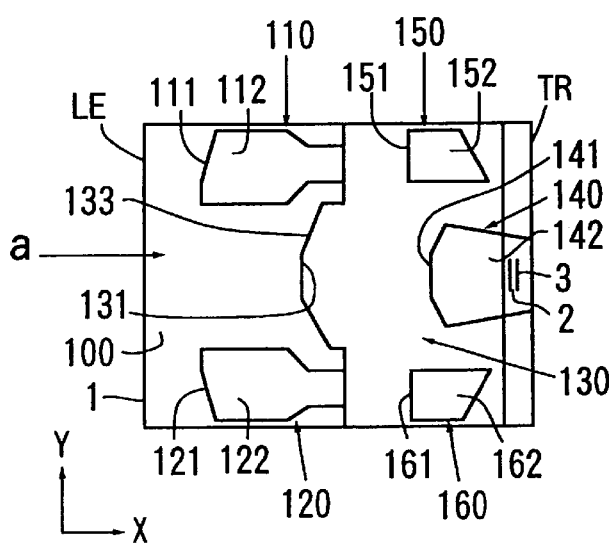
FIG. 19 illustrates a plan view of the head in FIG. 18 viewed from the side where the surface facing the medium is located.

FIG. 18 is a perspective illustrating a second embodiment of the head according to the present invention and FIG. 19 is a plan view of the head shown in FIG. 18 viewed from the side where the surface facing the medium is located.

In this second embodiment illustrated in FIGS. 18 and 19, the surface facing a medium is provided with a front flat surface 100, a first positive pressure generating portion 110, a second positive pressure generating portion 120, a first negative pressure generating portion 130, a third positive pressure generating portion 140, a fourth positive pressure generating portion 150 and a fifth positive pressure generating portion 160. The fourth positive pressure generating portion 150 is located behind the first positive pressure generating portion 110 over a distance and is provided with a step face 151 toward the leading edge LE. The fifth positive pressure generating portion 160 is located behind the second positive pressure generating portion 120 over a distance and is provided with a step face 161 toward the leading edge LE. The surface 152 of the fourth positive pressure generating portion 150 and the surface 162 of the fifth positive pressure generating portion 160 constitute flat surfaces that have a height essentially equal to that of the surface 112 of the first positive pressure generating portion 110 and the surface 122 of the second positive pressure generating portion 120.

Figure 20:
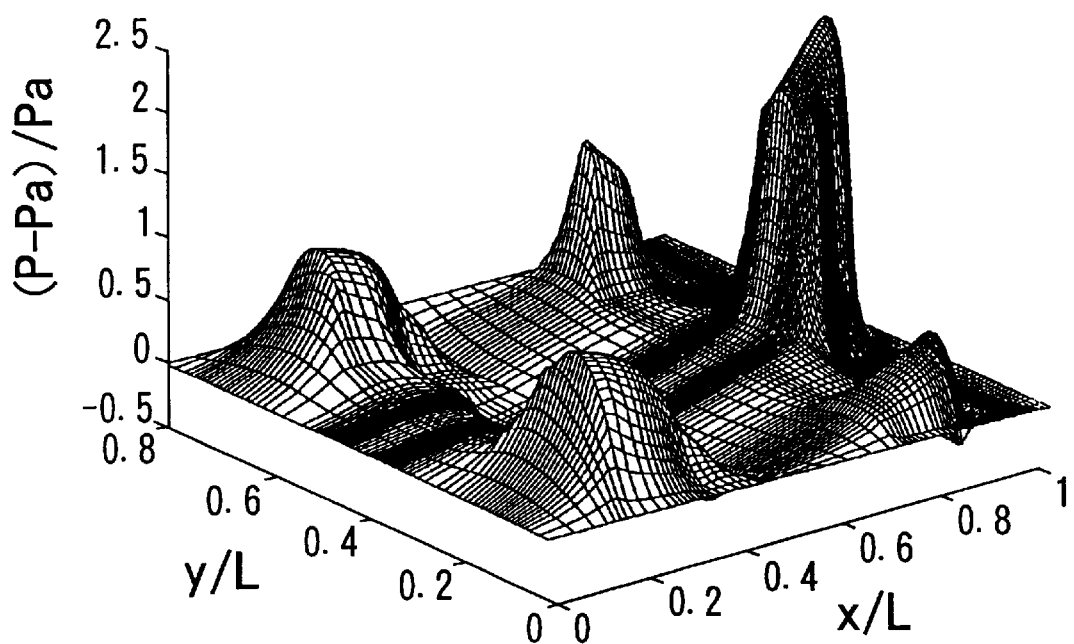
FIG. 20 shows three-dimensional data with respect to the relationship between the normalized slider length and the normalized pressure in the magnetic read/write apparatus employing the head illustrated in FIGS. 18 and 19.

FIG. 20 shows three dimensional data with respect to the relationship between the normalized slider length and the normalized pressure in a read/write apparatus employing the head illustrated in FIGS. 18 and 19. Having pressure distribution as indicated by these three-dimensional data, the head, when employed in a read/write apparatus, achieves advantages similar to those achieved by the head illustrated in FIGS. 1 to 5.

Figure 21:
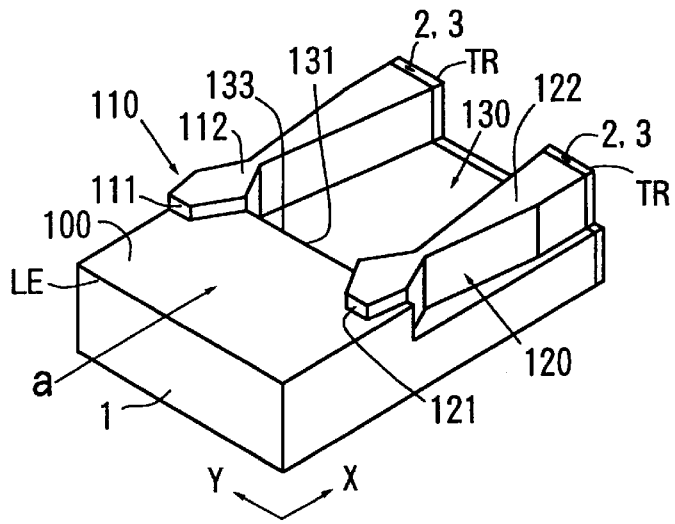
FIG. 21 illustrates a perspective of a third embodiment of the head according to the present invention.
Figure 22:
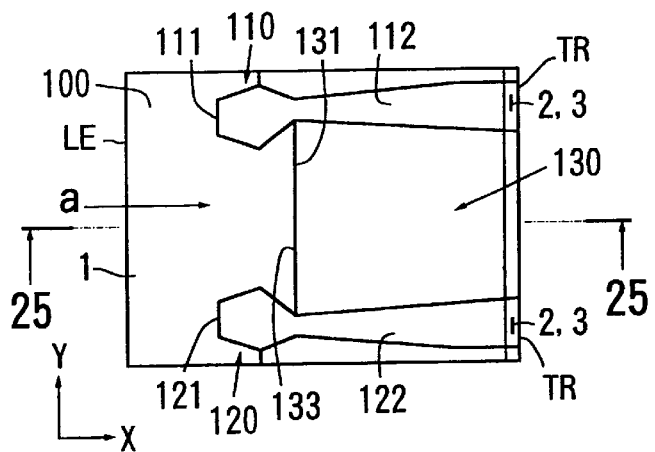
FIG. 22 illustrates a plan view of the head in FIG. 21 viewed from the side where the surface facing the medium is located.
Figure 23:
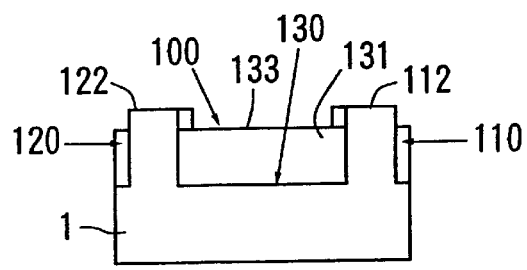
FIG. 23 illustrates a front view of the head shown in FIG. 22.
Figure 24:
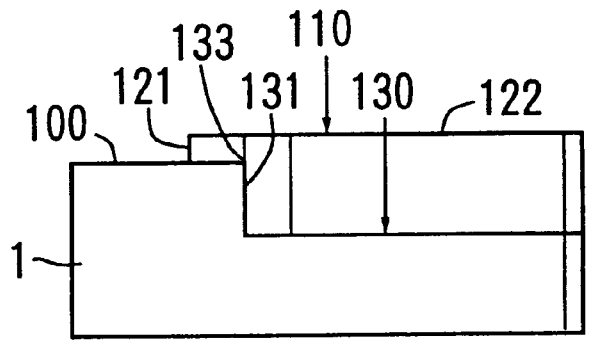
FIG. 24 illustrates a side elevation of the head shown in FIG. 22.
Figure 25:
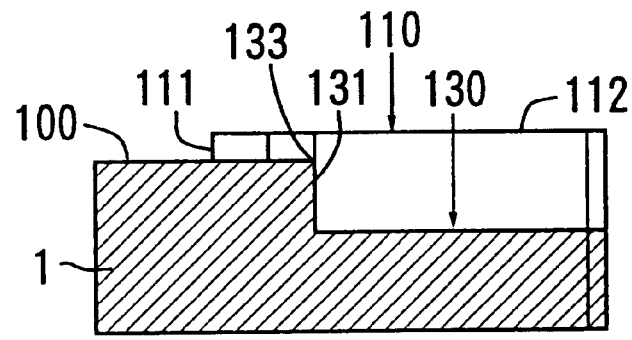
FIG. 25 illustrates a cross section along line 25—25 in FIG. 22.

FIG. 21 is a perspective view illustrating a third embodiment of the head according to the present invention, FIG. 22 is a plan view of the head shown in FIG. 21 viewed from the side where the surface facing the medium is located, FIG. 23 is a side elevation of the head shown in FIG. 22, FIG. 24 is a front view of the head shown in FIG. 22 and FIG. 25 is a cross section along line 25—25 in FIG. 22.

The surface facing a medium includes a front flat surface 100, a first and a second positive pressure generating portion 110 and 120 and a first negative pressure generating portion 130.

The front flat surface 100 is provided starting at the leading edge LE and continuing on to an intermediate point along the lengthwise direction X that matches the airflow direction (a). The first and second positive pressure generating portions 110 and 120 have essentially the same height and are provided separated from each other by a distance at the two sides in the widthwise direction Y which runs perpendicular to the lengthwise direction X, with their edges toward the leading edge LE constituting step faces 111 and 121 that rise up from the front flat surface 100. The first and second positive pressure generating portions 110 and 120 extend to the trailing edge TR. As a result, the surfaces 112 and 122 of the first and second positive pressure generating portions 110 and 120 respectively function as air bearing surfaces.

The first negative pressure generating portion 130 drops off in a step from the rear end of the front flat surface 100 and extends to the trailing edge TR.

The transducers 2 and 3 are provided at the trailing edge TR at least at either the first or second positive pressure generating portions 110 and 120. In the third embodiment, the transducers 2 and 3 are provided at both the first and second positive pressure generating portions 110 and 120.

The front flat surface 100 extends from the leading edge LE to the approximate center in the lengthwise direction of the slider 1 and is continuous to the first and second positive pressure generating portions 110 and 120 with a step relative to the front flat surface 100. The level difference of the step face formed between the front flat surface 100 and the surface 112 and between the front flat surface 100 and the surface 122 is set at a specific dimension of, for instance, 0.1 to 1.0 μm.

The height of the steps constituting the step faces 111 and 121, the size, shape and the like of the surfaces 112 and 122 continuous to the step faces 111 and 122 are selected as appropriate to achieve the required flying characteristics at a flying height of 25 nm or less.

The front edge 133 of the first negative pressure generating portion 130, must be closed as viewed from the airflow direction (a). In this case, the front edge 133 is typically constituted as a step face 131. The height, shape and the like of the step face 131 are selected as appropriate to achieve the required flying characteristics at a flying height of 25 nm or less. More specifically, the height of the step 131 may be set at approximately 2.5 $\mu$m.

The structures of the transducers 2 and 3 in the head in this embodiment and its application in a read/write apparatus are identical to those of the head of the first embodiment.

With the head structured as described above, when it is adopted in a read/write apparatus with the areas of the first and second positive pressure generating portions 110 and 120 set at a specific size, the load capacity at the air inflow side increases, even when an ultra low flying height of 25 nm or less is achieved, which results in an increase in the air lubricating film stiffness. Consequently, a flying state with a low pitch angle is maintained in a stable manner, thereby improving the following stability of the head relative to the disk-like medium surface motion. Thus, even when the flying height is reduced to 25 nm or less, contact between the head and the disk-like medium surface at the trailing edge TR of the slider where the flying height is at its minimum can be prevented.

Since the first and second positive pressure generating portions 110 and 120 have essentially the same height and are provided at the two sides in the widthwise direction Y separated by a distance, stabilization in the roll angle is achieved as well.

Moreover, with the new air bearing surface structure described above, the pitch angle can be set at $3 \times 10^{-4}$ (rad) or smaller, and contact between the trailing edge TR of the slider 1 and the disk-like medium can be prevented even at a flying height of 25 nm or less.

Furthermore, each of the mentioned surfaces can be formed through integrated machining by employing a high accuracy pattern forming technology such as dry etching on the surface of the slider 1 that faces opposite the medium.

Thus, according to the present invention, a smaller and thinner head that is extremely effective for achieving a higher writing density and an increase in the storage capacity and demonstrates outstanding mass productivity is provided.

As has already been explained in reference to FIG. 17, when the slider 1 is miniaturized, while the air lubricating film stiffness is reduced, the following stability relative to parallel oscillations of the disk-like medium does not deteriorate since the slider mass is reduced.

In addition, since the air bearing contour is formed symmetrically relative to the central axis of the slider 1 in the lengthwise direction X and the air bearing surfaces can be formed through integrated machining employing a microfabrication technology such as dry etching without having to perform mechanical machining, the dimensional management in mass production is facilitated, thereby achieving a high degree of mass productivity.

In this embodiment, too, the characteristics are realized that achieve:
flying height g1: 8 to 12 nm $1.0 \times 10^{-4}$ (rad)<pitch angle $\beta < 1.8 \times 10^{-4}$ (rad)

Next, in reference to measured data, advantages that are achieved by the read/write apparatus employing the head according to the present invention are explained. The specifications of the head 6, the head suspension 5 and the disk-like medium 4 are the same as those in the head illustrated in FIGS. 1 to 5 and are as given below.

Figure 26:
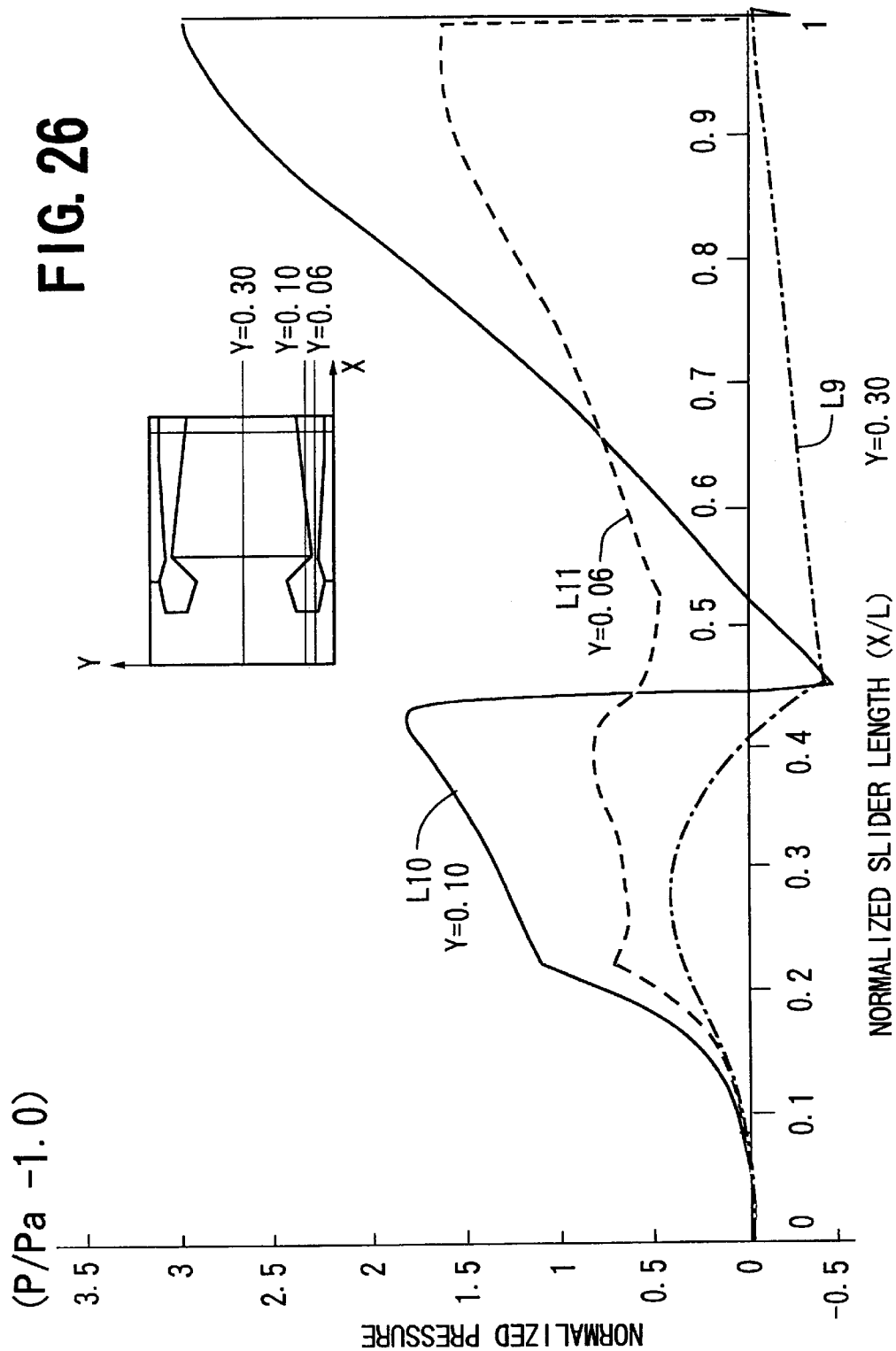
FIG. 26 shows data with respect to the relationship between the normalized slider length and the normalized pressure in the magnetic read/write apparatus employing the head illustrated in FIGS. 21 to 25.

(slider 1)
length: 0.8 mm
width: 0.6 mm
height: 0.3 mm
weight: 0.6 mg
(head suspension 5)
load force: 1.0 gf
spring rate: 1.8 gf/mm
load point: central area of the slider 1
(disk-like medium 4)
disk diameter: 2.5 inches
disk rotational speed: 7200 rpm FIG. 26 presents data that illustrate the relationship between the normalized slider length and the normalized pressure. The normalized slider length which is represented by the horizontal axis is expressed as the ratio (x/L) of the position x taken in the lengthwise direction from the leading edge LE and the entire length L of the slider 1. The normalized pressure represented by the vertical axis is determined by using a formula (P/Pa−1) with P being the pressure applied to the slider 1 and Pa being the atmospheric pressure. The curve L9 represents the pressure distribution achieved at a position distanced by y=0.3 mm from one end edge of the slider 1 in the widthwise direction Y, whereas the curve L10 represents the pressure distribution achieved at a position distanced by y=0.1 mm and the curve L11 represents the pressure distribution measured at a position distanced by y=0.06 mm.

Figure 27:
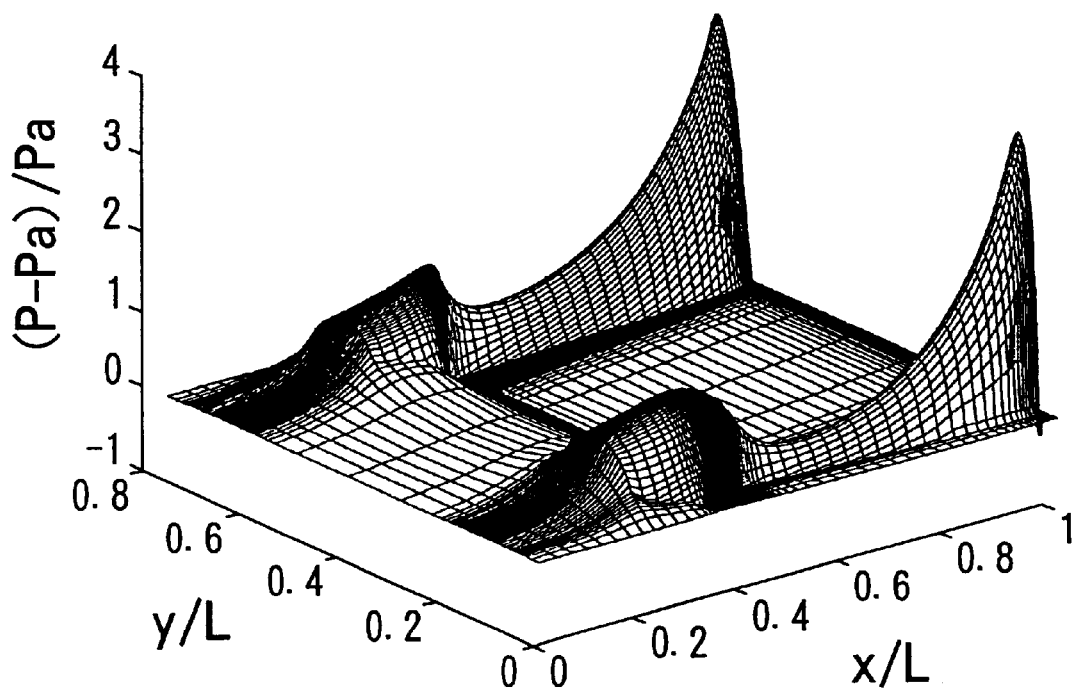
FIG. 27 shows three-dimensional data with respect to the relationship between the normalized slider length and the normalized pressure in the magnetic read/write apparatus employing the head illustrated in FIGS. 21 to 25.

FIG. 27 presents computer simulated data that three dimensionally indicate the relationship between the normalized slider length and the normalized pressure shown in FIG. 26.

In the head in this embodiment, the front flat surface 100 starts at the leading edge LE and continues on to an intermediate point along the lengthwise direction X that matches the airflow direction (a). The first and second positive pressure generating portions 110 and 120 have essentially the same height and are provided separated from each other over a distance from each other at the two sides in the widthwise direction Y which is perpendicular to the lengthwise direction X, with their edges toward the leading edge LE constituting step faces 111 and 121 that rise up from the front flat surface 100. Consequently, as FIGS. 26 and 27 clearly demonstrate, when the disk-like medium 4 is caused to rotate, a positive lift dynamic pressure is generated by the front flat surface 100, positive lift dynamic pressures are generated by the step faces 111 and 121 and a negative pressure is generated by the first negative pressure generating portion 130, along the airflow direction (a). The structure of the air bearing surface that achieves such pressure distribution is new, and contact with the disk-like medium can be prevented even at a flying height of 25 nm or less.

Moreover, since no narrowing is provided at the leading edge LE, the pitch angle can be set small. In addition, since the length of the slider 1 is small, the lift force can be kept small to reduce the flying height, and at the same time, the change in pressure distribution relative to the disk rotational speed and changes in the airflow direction (a) can be reduced to maintain the flying stability of the slider 1.

Figure 28:
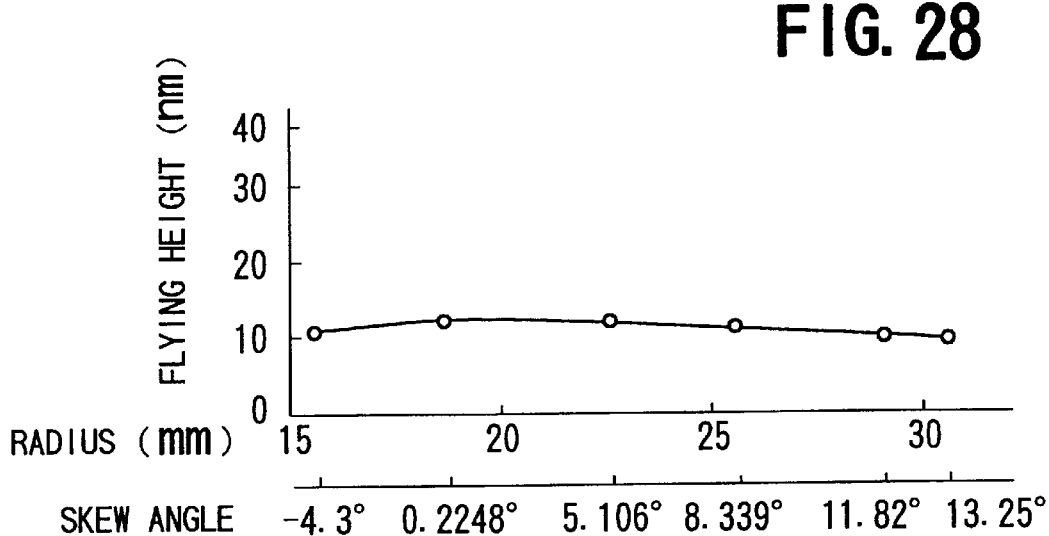
FIG. 28 shows data with respect to the relationship between the position of the slider and the flying height in the magnetic read/write apparatus employing the head illustrated in FIGS. 21 to 25.

FIG. 28 presents data that illustrate the relationship between the position of the slider and the flying height. The position of the slider is illustrated by both the radius of the medium and the skew angle. An explanation of the skew angle θ has already been given in reference to FIG. 9. FIG. 28 shows the rotating radius of the disk-like medium 4 under the skew angle θ. As FIG. 28 illustrates, with the head having the new air bearing surface structure described above, a very small flying height g1 of approximately 10 nm is assured over a wide skew angle range (−4.3 to 13.25°). Furthermore, a high degree of flying stability against disturbance and vibration is achieved over a wide skew angle range (−4.3 to 13.25°).

Figure 29:
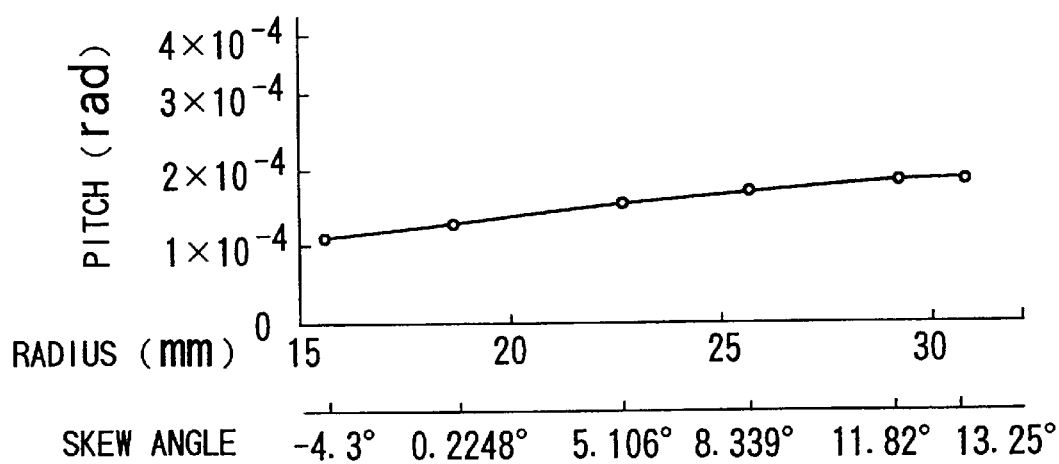
FIG. 29 shows data with respect to the relationship between the position of the slider and the pitch angle in the magnetic read/write apparatus employing the head illustrated in FIGS. 21 to 25.

FIG. 29 presents data that illustrate the relationship between the position of the slider and the pitch angle β. The position of the slider is illustrated by both the radius of the medium and the skew angle. As demonstrated in FIG. 29, with the head having the new air bearing surface structure according to the present invention, the pitch angle β can be set at $3 \times 10^{-4}$ (rad) or less, and contact between the trailing edge TR of the slider 1 and the disk-like medium 4 can be prevented even at a flying height of 25 nm or less.

Figure 30:
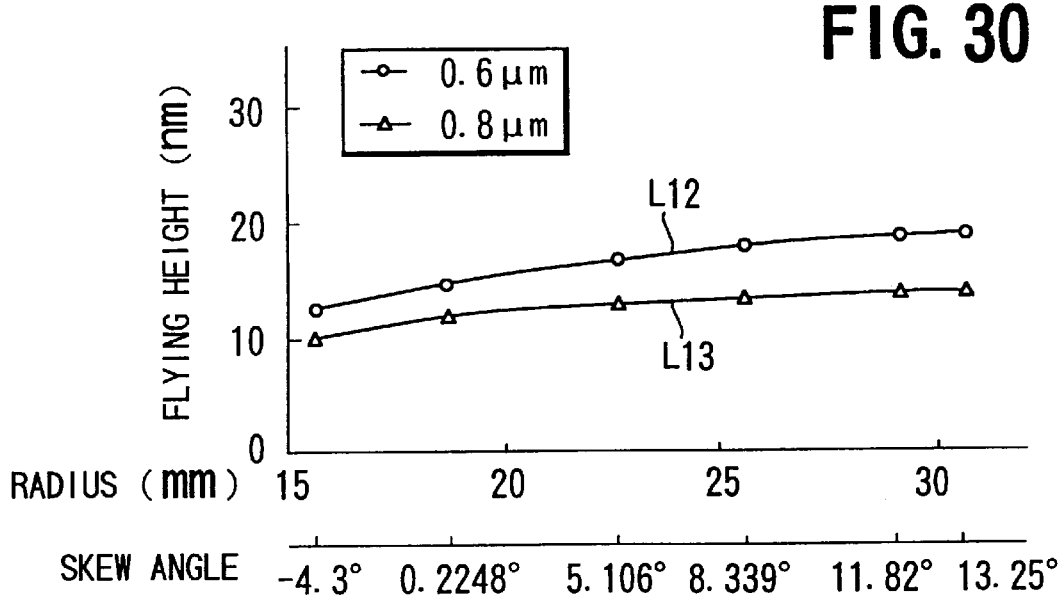
FIG. 30 shows data with respect to the relationship between the position of the slider and the flying height achieved as the heights of the step faces in the head are varied in the magnetic read/write apparatus employing the head illustrated in FIGS. 21 to 25.

FIG. 30 shows data with respect to the relationship between the position of the slider and the flying height g1 that is achieved as the heights h1 and h2 of the step faces 111 and 121 are varied. The position of the slider is illustrated by both the radius of the medium and the skew angle. The curve L12 represents the characteristics achieved when the heights h1 and h2 are set at 0.6 μm whereas the curve L13 represents the characteristics achieved when the heights h1 and h2 are set at 0.8 μm. The data indicate that by controlling the heights h1 and h2 of the step faces 111 and 121, the flying height g1 can be controlled. When the heights h1 and h2 are smaller than 0.6 μm, it becomes difficult to keep the flying height g1 at 20 nm or less. As the heights h1 and h2 increase, the flying height g1 becomes reduced. However, when they exceed 1.0 μm, the trailing edge TR tends to come in contact with the disk-like medium 4 more readily.

Figure 31:
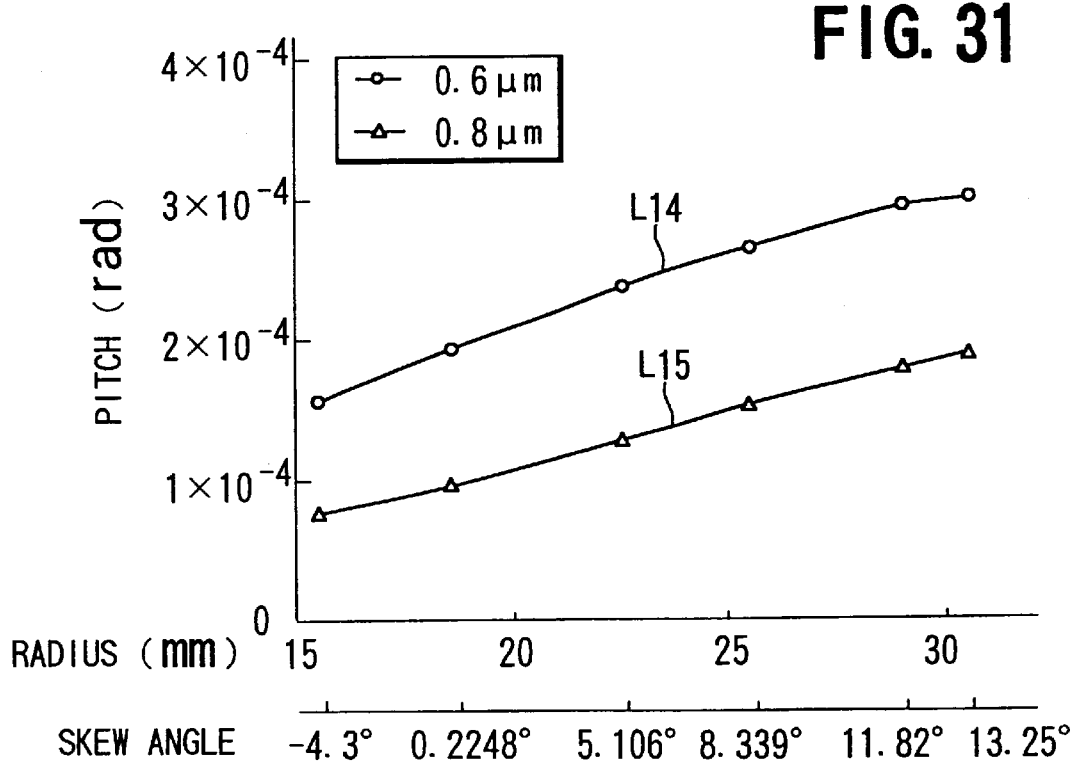
FIG. 31 shows data with respect to the relationship between the position of the slider and the pitch angle achieved as the heights of the step faces in the head are varied in the magnetic read/write apparatus employing the head illustrated in FIGS. 21 to 25.

FIG. 31 illustrates the relationship between the position of the slider and the pitch angle β that is achieved as the heights h1 and h2 of the step faces 111 and 121 are varied. The position of the slider is illustrated by both the radius of the medium and the skew angle. The curve L14 represents the characteristics achieved when the heights h1 and h2 are set at 0.6 μm whereas the curve L15 represents the characteristics achieved when the heights h1 and h2 are set at 0.8 μm. The data indicate that by controlling the heights h1 and h2 of the step faces 111 and 121, the pitch angle β can be controlled. When the heights h1 and h2 are smaller than 0.6 μm, it becomes difficult to keep the pitch angle β at $3 \times 10^{-4}$ (rad) or less in a range over which the skew angle θ is large (for instance, at 13.25°). When the heights h1 and h2 are larger than 0.8 μm, the pitch angle β becomes equal to or less than $1 \times 10^{-4}$ (rad) in the range over which the skew angle θ is small (for instance, at 0°), thereby increasing the risk of contact occurring at the leading edge, and when the heights h1 and h2 exceed 1 μm, contact results.

To sum up the information presented in FIGS. 30 and 31, it is desirable to set the heights h1 and h2 of the step faces 111 and 121 within the range of 0.6 to 1.0 μm.

The present invention is not limited to the specific examples given above. For instance, in FIG. 21, a third positive pressure generating portion may be provided at an approximately central portion of the trailing edge TR of the slider 1, as shown in FIGS. 1 to 5, to accommodate the transducers 2 and 3.

Figure 32:
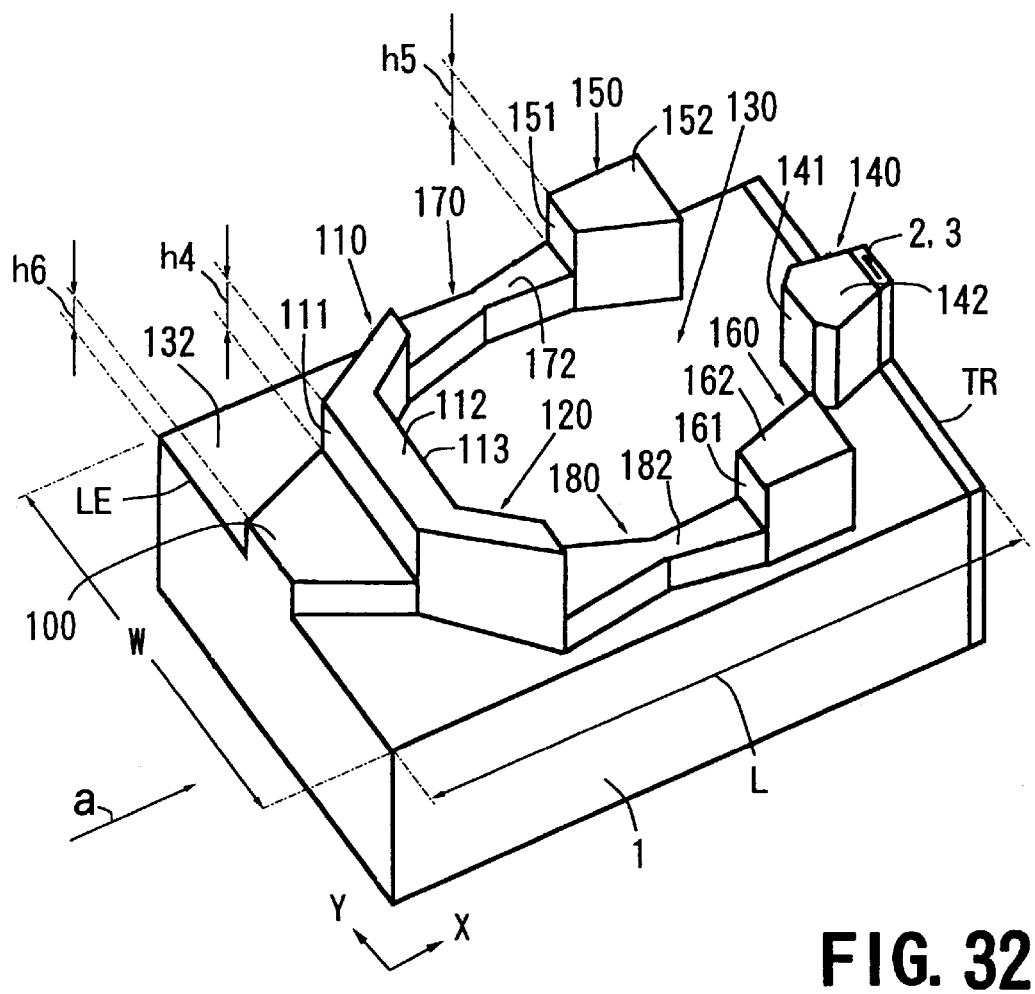
FIG. 32 illustrates a perspective of a fourth embodiment of the head according to the present invention.
Figure 33:
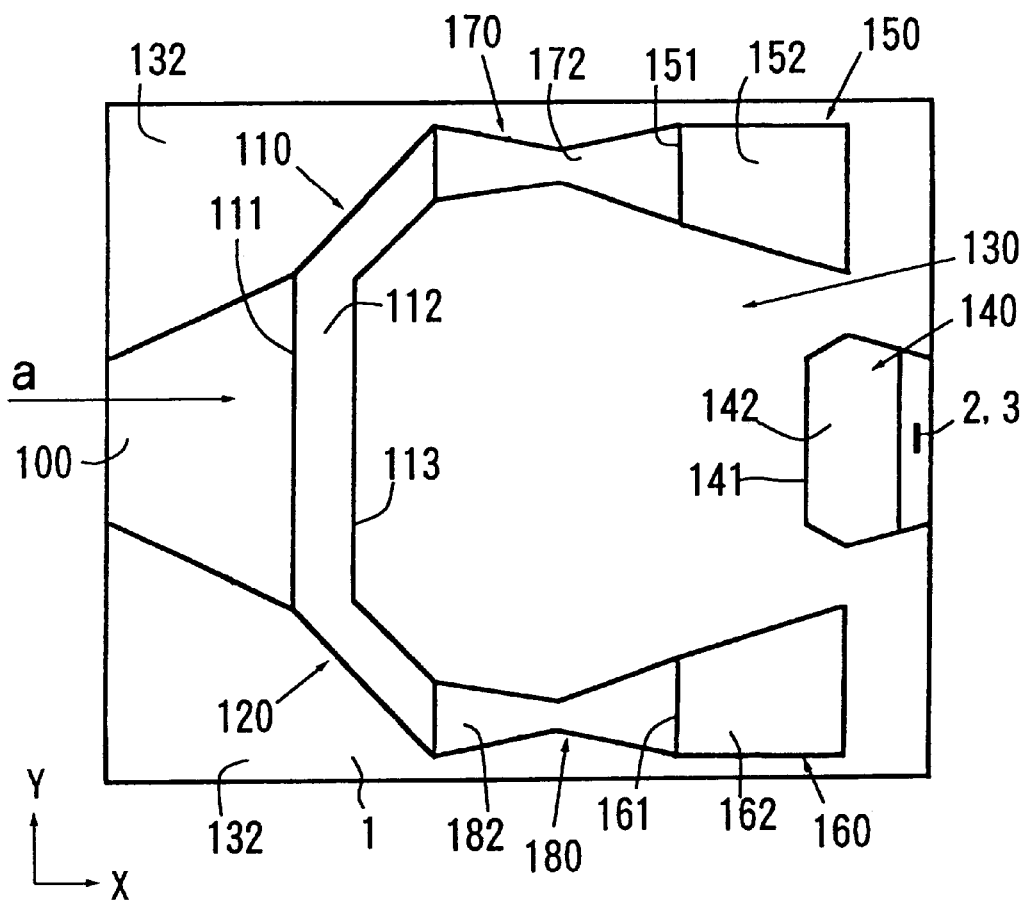
FIG. 33 illustrates a plan view of the head in FIG. 32 viewed from the side where the surface facing the medium is located.

Referring to FIGS. 32 and 33 which show a fourth embodiment, the surface facing a medium is provided with a front flat surface 100, a first negative pressure generating portion 130, a first positive pressure generating portion 110, a third positive pressure generating portion 140, a fourth positive pressure generating portion 150, a fifth positive pressure generating portion 160, a second negative pressure generating portion 170 and a third negative pressure generating portion 180. The first positive pressure generating portion 110 is provided in an area that is toward the leading edge LE from the center of the lengthwise direction X that matches the airflow direction (a). The second and third negative pressure generating portions 170 and 180 are provided at positions separated from each other over a distance in the widthwise direction Y running perpendicular to the lengthwise direction X at the rear of the first positive pressure generating portion 110 viewed in the airflow direction (a).

The fourth positive pressure generating portion 150 is located behind the second negative pressure generating 170 and the fifth positive pressure generating portion 160 is located behind the second negative pressure generating 180 over a distance in the widthwise direction Y. The first negative pressure generating portion 130 is provided inside an area enclosed by the first positive pressure generating portion 110, the second and third negative pressure generating portions 170 and 180 and the fourth and fifth positive pressure generating portions 150 and 160.

In this fourth embodiment, the first and second positive pressure generating portions are oriented to cross the slider 1 in the widthwise direction Y and are provided continuous in the widthwise direction Y to constitute a single positive pressure generating portion 110. The first positive pressure generating portion 110 is provided with an step face 111. The fourth and fifth positive pressure generating portions 150 and 160 are provided with step faces 151 and 161 respectively. The first positive pressure generating portion 110, the second and third negative pressure generating portions 170 and 180, the fourth and fifth positive pressure generating portions 150 and 160 and the first negative pressure generating portion 130 are positioned symmetrically relative to the central axis in the lengthwise direction X.

The level differences of h4 and h5 (=h4) of the steps constituting the step faces 111, 151 and 161 and the sizes and shapes of the step portions are selected as appropriate to achieve the required flying characteristics at a flying height of 25 nm or less. To be more specific, the level difference h4 and h5 at the step faces 111, 151 and 161 are set within a range of 0.3 to 1.0 μm.

At the second and third negative pressure generating portions 170 and 180 and the first negative pressure generating portion 130, the front edge viewed in the airflow direction (a) are closed by a step 113 dropping off from the first positive pressure generating portion 110.

Forming the first positive pressure generating portion 110, the second and third negative pressure generating portions 170 and 180, the fourth and fifth positive pressure generating portions 150 and 160 and the first negative pressure generating portion 130 as steps achieves advantages in that the required following stability described above are achieved and in that they can be formed through integrated machining by employing a high accuracy pattern forming technology such as dry etching.

The first positive pressure generating portion 110 is positioned in the widthwise direction Y toward the leading edge LE from the center of the slider 1 in the lengthwise direction X.

The second and third negative pressure generating portions 170 and 180 drop off from the surface 112 of the first positive pressure generating portion 110 in a step having a level difference h5. In the fourth embodiment, the surfaces 172 and 182 are formed so as to narrow starting from the side of the leading edge LE toward the central portion and so as to widen starting from the central portion toward the the side of the trailing edge TR, between the surface 112 of the first positive pressure generating portion 110 and the surface 152 of the second step portion 150 and between the surface 112 of the first positive pressure generating portion 110 and the surface 162 of the third step portion 160.

The surface 152 of the fourth positive pressure generating portion 150 and the surface 162 of the fifth positive pressure generating portion 160 rise up in a step from the surfaces 172 and 182 respectively having a level difference h5 and are separated from each other over a distance in the widthwise direction Y toward the trailing edge TR from the center of the slider 1 in the lengthwise direction X.

The first negative pressure generating portion 130 is provided lower than the surfaces 172 and 182 of the indented portions constituting the second and third negative pressure generating portions 170 and 180.

The surface of the first negative pressure generating portion 130 is enclosed by the surfaces 112, 152 and 162 and 172 and 182 in its periphery except at the side of the trailing edge TR. The level difference between the surface of the first negative pressure generating portion 130 and the surfaces 112, 152 and 162 is approximately 1 to 5 μm. The surface of the first negative pressure generating portion 130 is to constitute a base surface and all other surfaces are formed on the first negative pressure generating portion 130. In addition, areas that constitute flat surfaces having the same height as the surface of the first negative pressure generating portion 130 are formed at the two sides of the slider 1 in its widthwise direction Y, and steps formed between the surface 172 and the surface 112 of the first positive pressure generating portion 110 and between the surface 182 and the surface 112 of the first positive pressure generating portion 110 function as transverse pressurization air bearing steps.

Furthermore, the fourth embodiment includes a surface 142 of the third positive pressure generating portion 140. The third positive pressure generating portion 140 is provided at approximately the center of the slider 1 in the widthwise direction Y toward the trailing edge TR of the slider 1, rising up in a step from the base surface of the first negative pressure generating portion 130 by a level difference. Its rising front edge constitutes a step face 141. The surface 142 of the third positive pressure generating portion 140 has essentially the same height as the surface 112 of the first positive pressure generating portion 110, the surface 152 of the fourth positive pressure generating portion 150 and the surface 162 of the fifth positive pressure generating portion 160. The electromagnetic transducers 2 and 3 are mounted at the center of the third positive pressure generating portion 140 at the trailing edge TR.

In this fourth embodiment, a front flat surface 100 is provided between the leading edge of the slider 1 and the surface 112 of the first positive pressure generating portion 110. The front flat surface 100 rises up in a step from first negative pressure generating portion 130 by a level difference h6, to constitute a flat surface having the same height as that of the negative pressure generating portions 170 and 180. It is desirable to form the front flat surface 100 so that it narrows from the surface 112 of the first positive pressure generating portion 110 toward the leading edge LE.

The end edges defining the flat surface of each of the surfaces 100, 112, 130, 142, 152, 162, 172 and 182 may be straight lines, curved lines or a combination thereof.

Next, in reference to measured data, advantages that are achieved by the read/write apparatus employing the head according to the present invention are explained. The specifications of the head 6, the head supporting mechanism 5 and the disk-like medium 4 are as follows.

Figure 34:
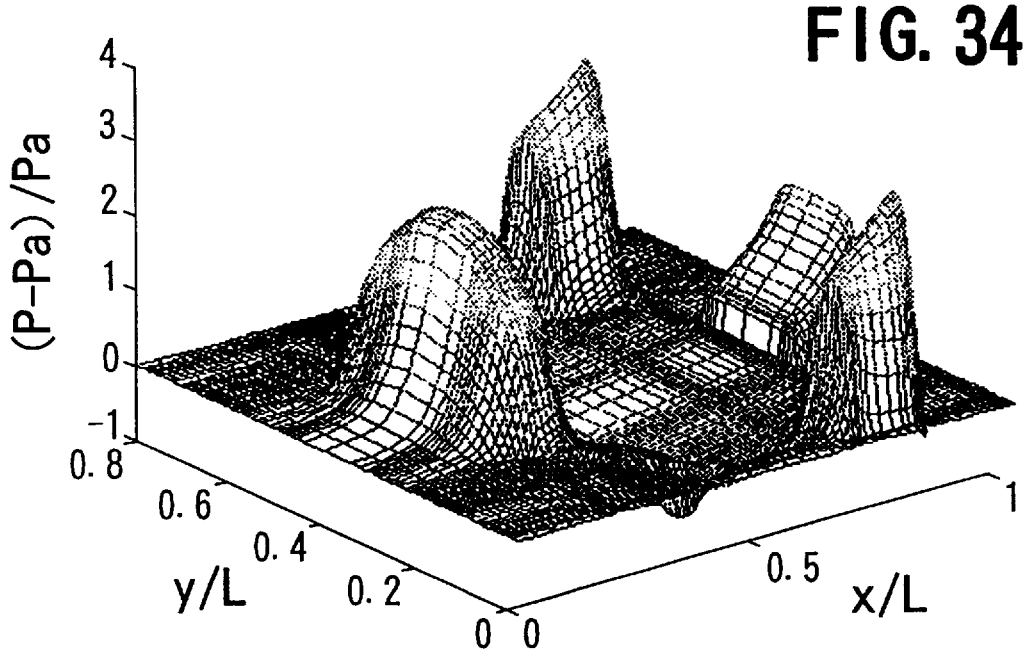
FIG. 34 shows computer simulation data that three-dimensionally illustrate the relationship between the normalized slider length and the normalized slider width, and the normalized pressure achieved by employing the head in the read/write apparatus shown in FIGS. 7 and 8.
Figure 35:
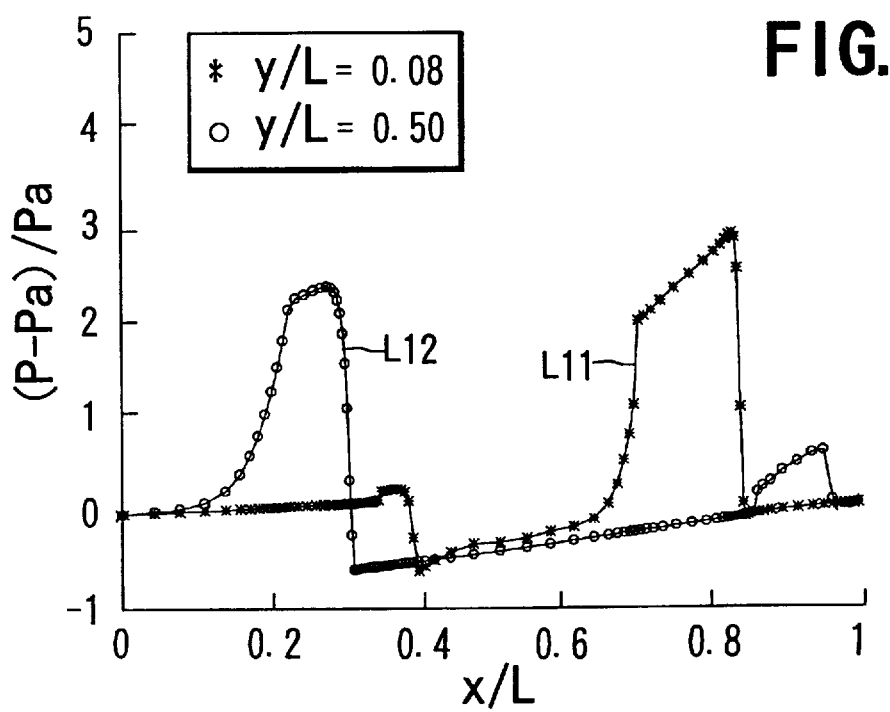
FIG. 35 shows data with respect to the relationship between the normalized slider length and the normalized pressure achieved by employing the head in the first embodiment in the read/write apparatus shown in FIGS. 7 and 8.

(slider 1)
length: 1.25 mm
width: 1.0 mm
height: 0.3 mm
weight: 1.6 mg
(head supporting mechanism 5)
load force: 0.5 gf
load point: offset d=100 μm
(disk-like medium 4)
disk rotational speed: 7200 rpm
disk diameter: 2.5 inches FIG. 34 presents computer simulation data which three-dimensionally illustrate the relationship between the normalized slider length, width and pressure achieved by the head in the fourth embodiment, and FIG. 35 presents data illustrating the relationship between the normalized slider length and the normalized pressure. The normalized slider length which is represented by the horizontal axis is expressed as the ratio (x/L) of the position x taken in the lengthwise direction X from the leading edge LE and the entire length L of the slider 1. The normalized slider width is expressed as the ratio (y/L) of the position y taken in the widthwise direction Y and the entire length L of the slider 1. The normalized pressure represented by the vertical axis is determined by using a formula (P−Pa)/Pa with P being the pressure applied to the slider 1 and Pa being the atmospheric pressure. The curve L12 represents the pressure distribution characteristics achieved at a position with the normalized width (y/L) at 0.5 (almost at the center in the widthwise direction), whereas the curve L11 represents the pressure distribution achieved at a position with the normalized width (y/L) at 0.08.

In the head in the fourth embodiment, the surface facing a medium is provided with a first positive pressure generating portion 110, first negative pressure generating portion 130, fourth and fifth positive pressure generating portions 150 and 160. The first positive pressure generating portion 110 is provided in an area that is toward the leading edge LE from the center in the lengthwise direction X that matches the airflow direction (a). There are two negative pressure generating portions 170 and 180 which are separated from each other over a distance in the widthwise direction Y running perpendicular to the lengthwise direction X to the rear of the first positive pressure generating portion 110 viewed in the airflow direction (a).

Fourth and fifth positive pressure generating portions 150 and 160 are provided at positions distanced from each other in the widthwise direction Y at the rear of the two negative pressure generating portions 170 and 180 respectively.

As a result, as is obvious from FIGS. 34 and 35, when the disk 4 is caused to rotate, the first lift dynamic pressure is generated by the first positive pressure generating portion 110 at approximately the center in the widthwise direction Y of the head 6 along the airflow direction (a) (see the curve L12).

At the two ends of the head 6 in its widthwise direction Y, second lift dynamic pressures are generated by the fourth and fifth positive pressure generating portions 150 and 160 at the trailing edge TR, and negative pressures are generated by the negative pressure generating portions 170 and 180 toward the leading edge from the second lift dynamic pressures (see the curve L11).

Moreover, in the area enclosed by the first positive pressure generating portion 110, the fourth and fifth positive pressure generating portions 150 and 160 and the negative pressure generating portions 170 and 180, the negative pressure is generated by the first negative pressure generating portion 130 (see the curve L12).

The structure that achieves such pressure distribution is new and it constitutes a basis for preventing contact between the head and the disk-like medium even at a flying distance of 25 nm or less.

In addition, the structure in the fourth embodiment includes a surface 142 of the third positive pressure generating portion 140. The surface 142 of the third positive pressure generating portion 140 has essentially the same height as the surface 112 of the first positive pressure generating portion 110 and the surfaces 152 and 162 of the fourth and fifth positive pressure generating portions 150 and 160 and generates a positive pressure at approximately the center in the widthwise direction Y of the head 6 (see the curve L12). Because of this positive pressure, the air lubricating film stiffness is increased at the trailing edge TR, thereby making it possible to even more reliably prevent contact between the head and the disk-like medium at a flying height of 25 nm or less. Since the transducers 2 and 3 are mounted at the center of the trailing edge TR at the surface 142 of the third positive pressure generating portion 140, an increase in the air lubricating film stiffness is achieved by the third positive pressure generating portion 140 and the resulting effect for preventing contact contributes to reliably protect the transducers 2 and 3 from damage and destruction.

In the fourth embodiment, the front flat surface 100 is provided between the leading edge LE and the surface 112 of the first positive pressure generating portion 110 at the slider 1. The front flat surface 100 rises up in a step from the first negative pressure generating portion 130 with a level difference h6 to constitute a flat surface having the same height as that of the step portions 170 and 180. Thus, the air lubricating film stiffness increases toward the leading edge LE. In particular, by forming the front flat surface 100 so as to narrow from the surface 112 of the first positive pressure generating portion 110 toward the leading edge LE, a small pitch angle β can be realized and flying characteristics with a reduction in fluctuations of the pitch angle β can be achieved over the entire surface of the disk-like medium, due to the air bearing effect achieved at the front flat surface 100, when the structure is adopted in a read/write apparatus.

In addition, in the fourth embodiment, the negative pressure generating portions 170 and 180 are formed so as to narrow starting from side of the leading edge LE toward the central portion and so as to widen starting from the central portion toward the the side of the trailing edge TR, between the surface 112 of the first positive pressure generating portion 110 and surfaces 152 and 162 of the fourth and fifth positive pressure generating portions 150 and 160. With such a structure, the roll characteristics are improved. Moreover, since the surface 112 of the first positive pressure generating portion 110, the surface 152 of the fourth positive pressure generating portion 150 and the surface 162 of the fifth positive pressure generating portion 160 are structured to have two-stage step faces toward the leading edge in the airflow direction (a).

Figure 36:
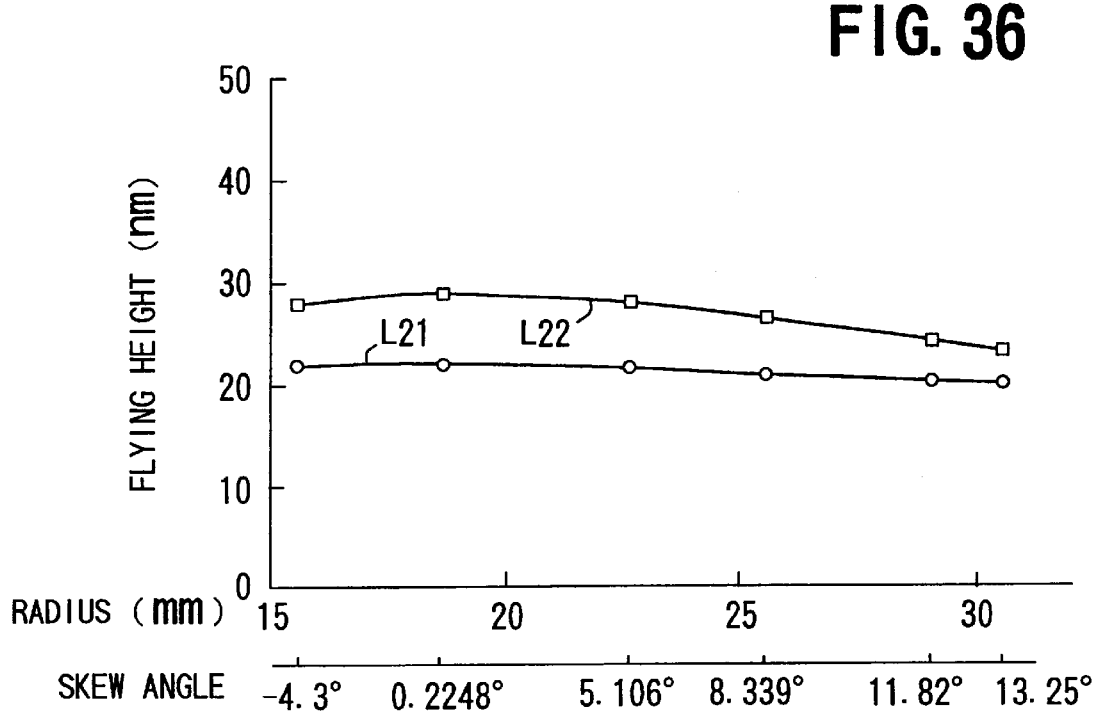
FIG. 36 shows data with respect to the relationship between the position of the slider and the flying height achieved in the read/write apparatus employing the head shown in FIG. 32.

FIG. 36 presents data illustrating the relationship between the position of the slider and the flying height. The horizontal axis represents the rotating radius of the disk-like medium 4 which is in a corresponding relationship with the skew angle θ. The curve L21 represents characteristics achieved by employing the head in the fourth embodiment according to the present invention illustrated in FIGS. 32 and 33, whereas the curve L22 represents characteristics achieved by employing a regular positive pressure/negative pressure combined type head (an example of the prior art) having two steps with the length L, the width W and the thickness of the slider at 1.25 mm, 1.0 mm and 0.3 mm respectively. As shown in FIG. 36, when the head in the example of the prior art is employed, the minimum value of the flying height achieved within a skew angle range of −4.3 to 13.25° is approximately 24 nm and the flying height fluctuate within a range of 24 nm to 29 nm. In contrast, with the head according to the present invention, a very small flying height of approximately 22 nm is assured over a wide skew angle range of −4.3 to 13.25°. Moreover, only approximately 1 nm of fluctuation in the flying height is observed over the skew angle range of −4.3 to 13.25° and a high degree of flying stability against disturbance and vibration is achieved.

Figure 37:
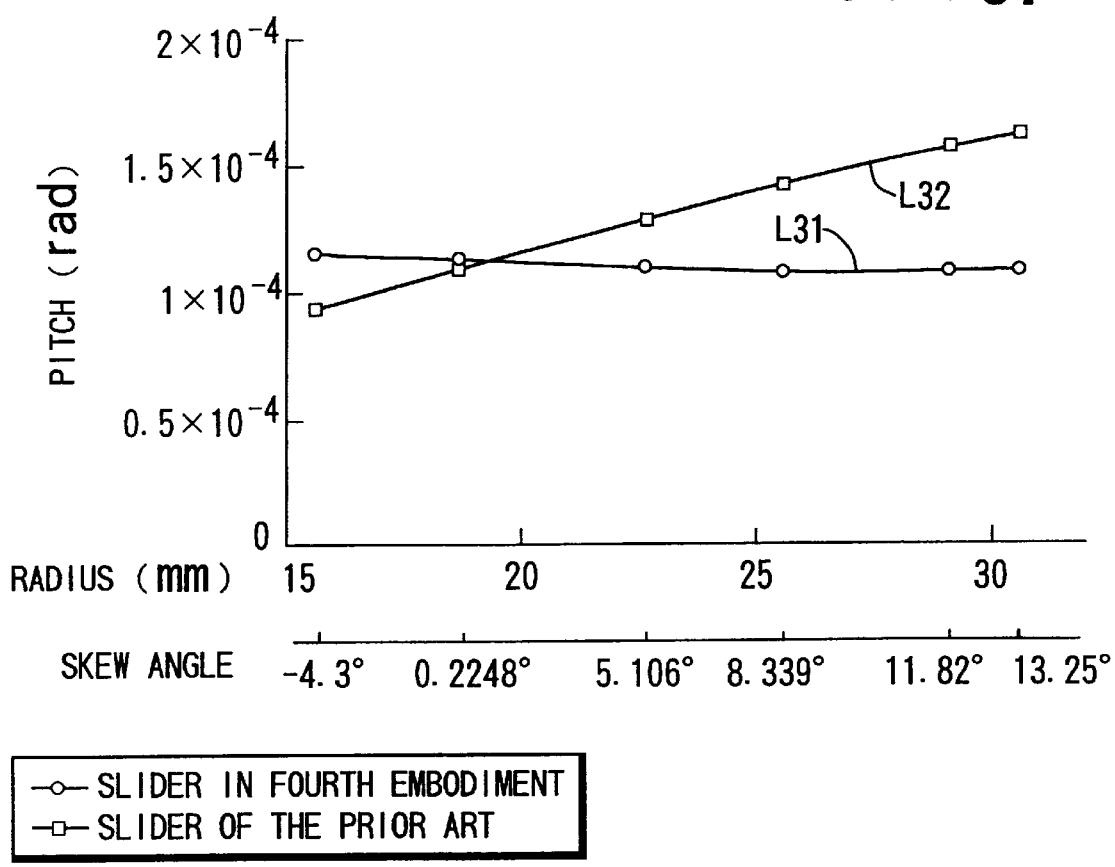
FIG. 37 shows data with respect to the relationship between the position of the slider and the pitch angle achieved in the read/write apparatus employing the head shown in FIG. 32.

FIG. 37 presents data illustrating the relationship between the position of the slider and the pitch angle β. The curve L31 represents the characteristics achieved by employing the head in the fourth embodiment according to the present invention, whereas the curve L32 represents the characteristics achieved when a regular positive pressure/negative pressure combined type head having two steps (an example of the prior art) is employed. As the curve L32 in FIG. 37 clearly indicates, the pitch angle β fluctuates within a range of $0.9 \times 10^{-4}$ (rad) to $1.7 \times 10^{-4}$ (rad) over the skew angle range of −4.3 to 13.25° in the case of the prior art example.

In contrast, with the head according to the present invention, as the curve L31 clearly indicates, the pitch angle β remains at or smaller than $1.5 \times 10^{-4}$ (rad) demonstrating near stability over a wide skew angle range of −4.3 to 13.25°. Furthermore, as FIGS. 32 and 33 clearly show, no taper is provided at the leading edge LE in the head according to the present invention, and this minimizes the pitch angle β.

Thus, by employing the head in the fourth embodiment according to the present invention, a high degree of stable air lubricating film stiffness can be achieved over the entire seek area of the disk-like medium 4, thereby making it possible to prevent contact between the trailing edge TR of the slider 1 and the disk-like medium 4 even at a flying height of 25 nm or less.

Figure 38:
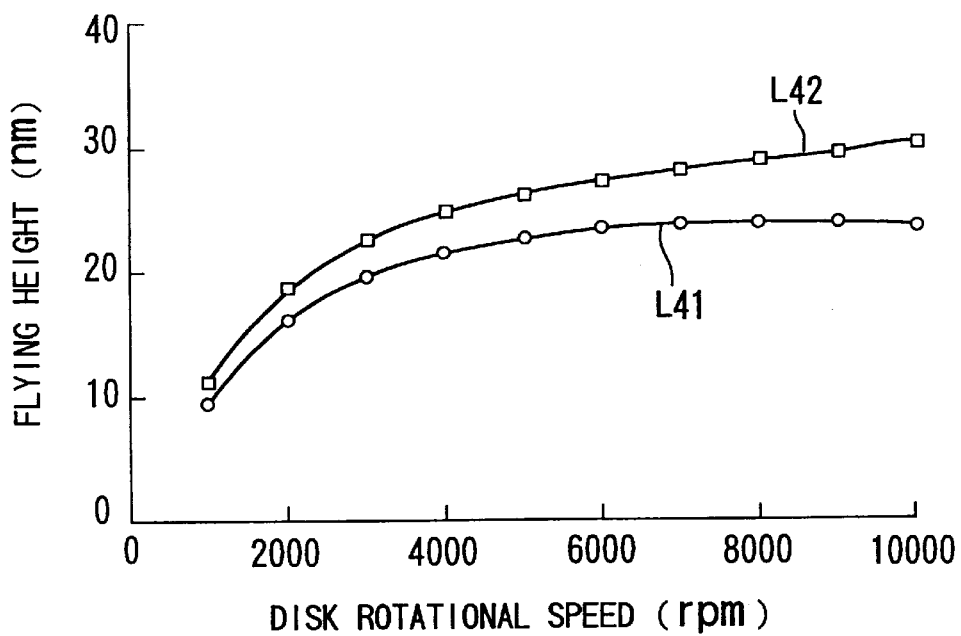
FIG. 38 shows data with respect to the relationship between the rotational speed of the disk-like medium (rpm) and the flying height achieved in the read/write apparatus employing the head shown in FIG. 32.

FIG. 38 shows data with respect to the relationship between the disk rotational speed (rpm) of the disk-like medium and the flying height. In FIG. 38, the horizontal axis represents the disk rotational speed (rpm) of the disk-like medium and the vertical axis represents the flying height (nm). The curve L41 represents the characteristics achieved by employing the head in the fourth embodiment according to the present invention shown in FIGS. 32 and 33, whereas the curve L42 indicates the characteristics achieved when a conventional positive pressure/negative pressure combined type head having two steps (an example of the prior art) is used. The skew angle θ is approximately 0°.

FIG. 38 indicates that when the head in the example of the prior art is employed, the flying height keeps increasing as the disk rotational speed of the disk-like medium increases, as indicated by the curve L42. The flying height is inclined to continue increasing even as the disk rotational speed of the disk-like medium increases through 10,000 rpm.

In contrast, when the head in the fourth embodiment according to the present invention is used, the flying height becomes more stable as the disk rotational speed of the disk like medium increases. The data in FIG. 38 indicate that when the disk rotational speed of the disk-like medium exceeds approximately 6000 rpm, the flying height becomes stable at approximately 24 nm. Thus, the head according to the present invention demonstrates takeoff characteristics whereby the flying height becomes stabilized earlier to enter constant operating state.

Figure 39:
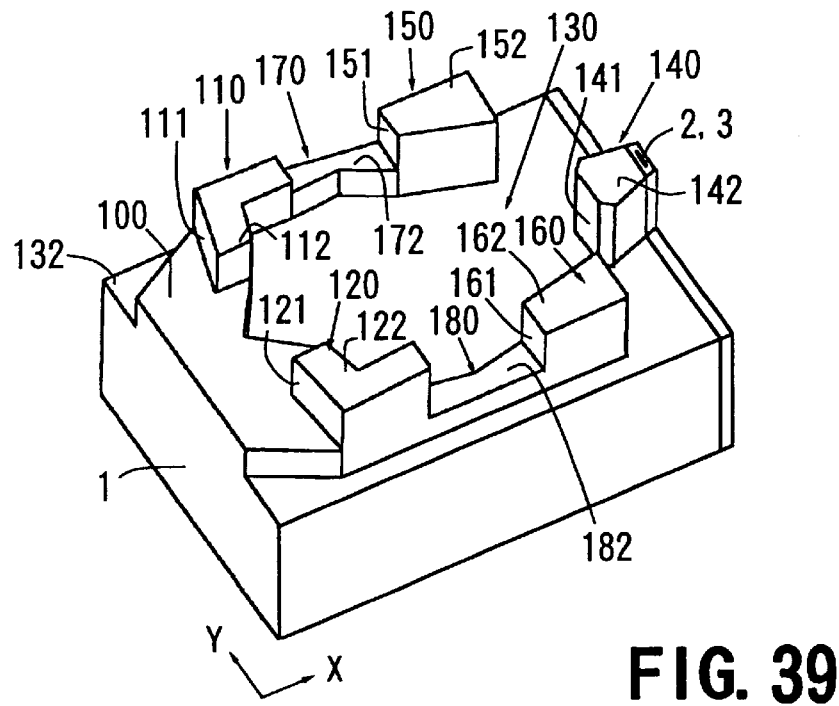
FIG. 39 illustrates a perspective of a fifth embodiment of the head according to the present invention.
Figure 40:
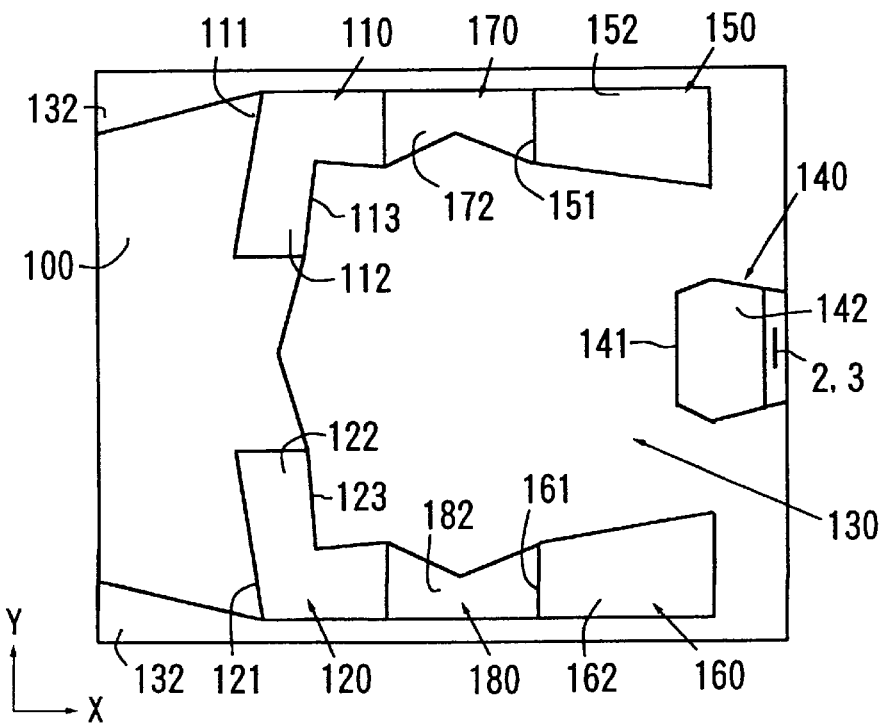
FIG. 40 illustrates a plan view of the head in FIG. 39 viewed from side where the surface facing the medium is located.

Referring to FIGS. 39 and 40 which show the fifth embodiment, the head according to the present invention comprises a slider 1 and transducers 2 and 3. The transducers 2 and 3 constitute two elements, i.e. a writing element and a reading element. The surface facing a medium is provided with two separate positive pressure generating portions 110 and 120 at the middle portion of the slider 1 in the widthwise direction Y. The first positive pressure generating portion 110 is provided with a step face 111 and a surface 112, whereas the second positive pressure generating portion 120 is provided with a step face 121 and a surface 122. Other structural features are identical to those of the head illustrated in the fourth embodiment (see FIGS. 32 and 33).

Figure 41:
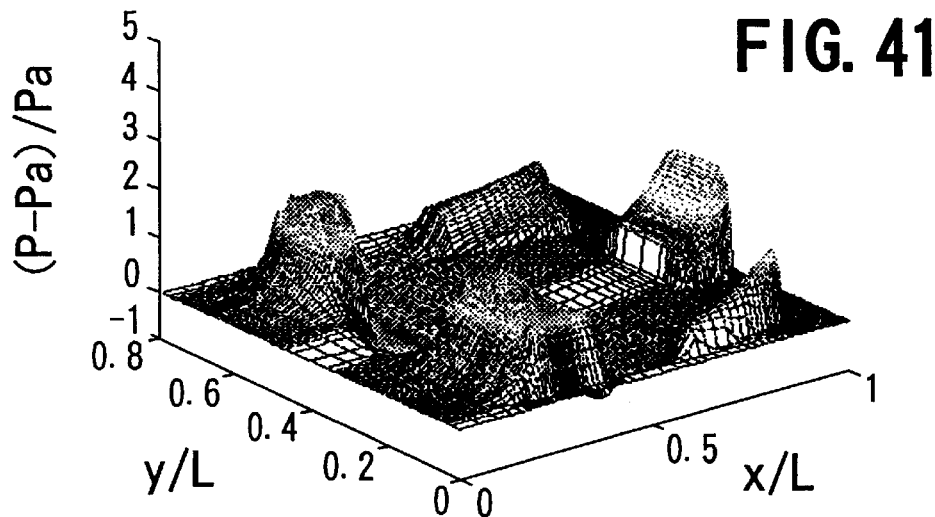
FIG. 41 shows computer simulation data that three-dimensionally illustrate the relationship between the normalized slider length and the normalized slider width, and the normalized pressure achieved by employing the head shown in FIG. 39 in the read/write apparatus shown in FIGS. 7 and 8.
Figure 42:
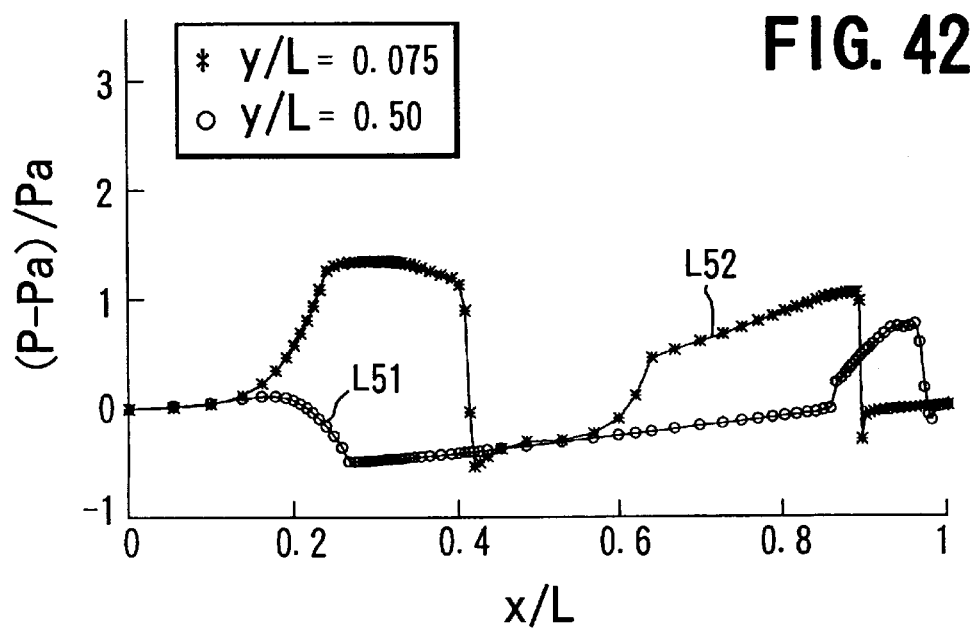
FIG. 42 shows data with respect to the relationship between the normalized slider length and the normalized pressure achieved by employing the head shown in FIG. 39 in the read/write apparatus shown in FIGS. 7 and 8.

FIG. 41 presents computer simulation data that three-dimensionally illustrate the relationship between the normalized slider length (x/L) and the normalized width (y/L), and the normalized pressure achieved when the head is employed, and FIG. 42 presents data illustrating the relationship between the normalized slider length (x/L) and the normalized pressure achieved when the head is employed. The various conditions for driving the head 6, the head supporting mechanism 5 and the disk-like medium 4 are as has been explained earlier. The normalized slider length (x/L) represented by the horizontal axis and the normalized pressure (P−Pa)/Pa represented by the vertical axis are as has already been explained in reference to FIG. 35. The curve L51 represents the pressure distribution characteristics at a position expressed as the normalized width (y/L)=0.5 from one end edge of the slider 1 in the widthwise direction Y (approximately the center in the widthwise direction), and the curve L52 represents the pressure distribution achieved at a position expressed as the normalized width (y/L)=0.075.

The pressure distribution illustrated in FIGS. 41 and 42 differ from the pressure distribution shown in FIGS. 34 and 35 in that, since the area between the first and second positive pressure generating portions 110 and 120 is constituted of a front flat surface 100, no marked positive pressure is generated at the central portion of the slider 1 toward the air inflow side (see the curve L51). Instead, large positive pressures are generated by the first and second positive pressure generating portions 110 and 120 at the two sides in the widthwise direction Y of the slider 1 (see the curve L52).

As FIGS. 41 and 42 clearly indicate, when the disk-like medium 4 is caused to rotate, first lift dynamic pressures are generated by the first and second positive pressure generating portions 110 and 120 at the two sides in the widthwise direction Y of the head 6 along the airflow direction (a) (see the curve L52), second lift dynamic pressures are generated by the fourth and fifth positive pressure generating portions 150 and 160 toward the trailing edge TR and negative pressures are generated by the second and third negative pressure generating portions 170 and 180 toward the air inflow side from the second lift dynamic pressures (see the curve L52). In addition, within an area enclosed by the first and second positive pressure generating portions 110 and 120, the fourth and fifth positive pressure generating portions 150 and 160 and the second and third negative pressure generating portions 170 and 180, a negative pressure is generated by the first negative pressure generating portion 130 (see the curve L51). The structure that achieves such pressure distribution is new, and it constitutes a basis for preventing contact between the head and the disk-like medium even at a flying height of 25 nm or less.

Moreover, since the surface 142 of the third positive pressure generating portion 140 is provided toward the trailing edge TR, a positive pressure is generated at approximately the center of the head 6 in the widthwise direction Y (see the curve L51). This increases the air lubricating film stiffness at the trailing edge TR, thereby preventing contact between the head and the disk-like medium at a flying height of 25 nm or less even more reliably. Since the transducers 2 and 3 are mounted at the center of the surface 142 of the third positive pressure generating portion 140 at the trailing edge TR, the increase in the air lubricating film stiffness achieved and the resulting effective prevention of contact reliably protect the transducers 2 and 3 from damage and destruction.

In addition, the front flat surface 100 is provided toward the leading edge LE which rises up in a step from the first negative pressure generating portion 130 with the level difference to constitute a flat surface having the same height as that of the negative pressure generating portions 170 and 180. Thus, the air lubricating film stiffness increases toward the leading edge LE. Since the front flat surface 100 is formed so as to narrow from the surfaces 112 and 122 of the first and second positive pressure generating portions 110 and 120 respectively toward the leading edge LE, a small pitch angle β can be realized and flying characteristics with a reduction in fluctuations of the pitch angle β can be achieved over the entire surface of the disk-like medium, due to the air bearing effect achieved through the front flat surface 100, when the structure is adopted in a read/write apparatus.

Furthermore, the negative pressure generating portions 170 and 180 are formed so as to narrow starting from the side of the leading edge LE toward the central portion and so as to widen starting from the central portion toward the side of the trailing edge TR, between the surfaces 112 and 122 of the first and second positive pressure generating portions 110 and 120 and the surfaces 152 and 162 of the fourth and fifth positive pressure generating portions 150 and 160. With such a structure, the roll characteristics are improved. Moreover, the surface 112 of the first positive pressure generating portion 110, the surface 122 of the first positive pressure generating portion 120, the surface 152 of the fourth positive pressure generating portion and the surface 162 of the fifth positive pressure generating portion are structured to have two-stage step faces toward the airflow direction (a).

Figure 43:
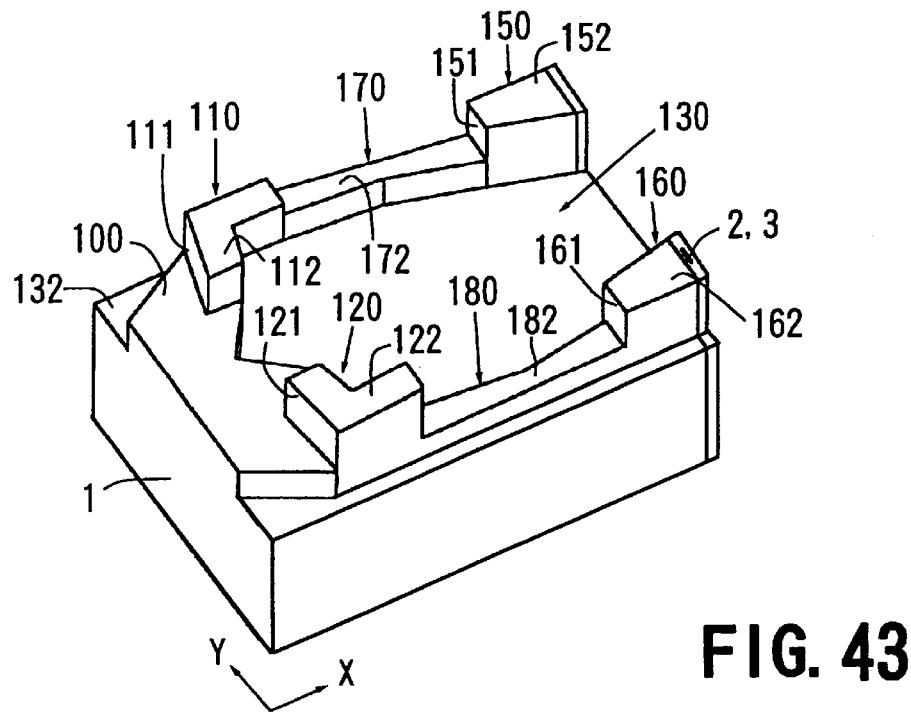
FIG. 43 illustrates a perspective of a sixth embodiment of the head according to the present invention.
Figure 44:
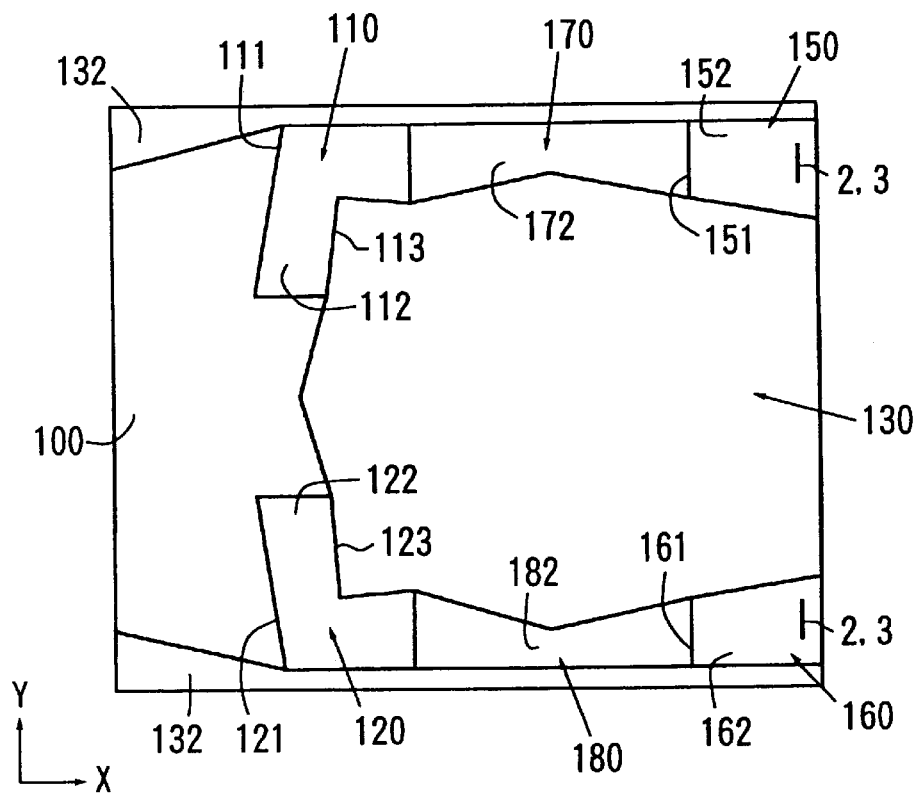
FIG. 44 illustrates a plan view of the head in FIG. 43 viewed from side where the surface facing the medium is located.

Referring to FIGS. 43 and 44 which show the sixth embodiment, the head according to the present invention comprises a slider 1 and transducers 2 and 3. The transducers 2 and 3 constitute two elements, i.e. a writing element and a reading element. In the head in this example, the surface 152 of the fourth positive pressure generating portion 150 and the surface 162 of the fifth positive pressure generating portion 160 are provided extending to the trailing edge TR of the slider 1, with the transducers 2 and 3 mounted at least at either the surface 152 of the fourth positive pressure generating portion 150 or the surface 162 of the fifth positive pressure generating portion 160.

The structures of the transducers 2 and 3 in the head in the sixth embodiment and its application to a read/write apparatus are the same as those of the head illustrated in the fourth embodiment (see FIGS. 32 and 33).

Next, in reference to measured data, advantages that are achieved by a read/write apparatus employing the head in the sixth embodiment illustrated in FIGS. 43 and 44 are explained. The specifications of the head 6, the head supporting mechanism 5 and the disk-like medium 4 are as follows.

Figure 45:
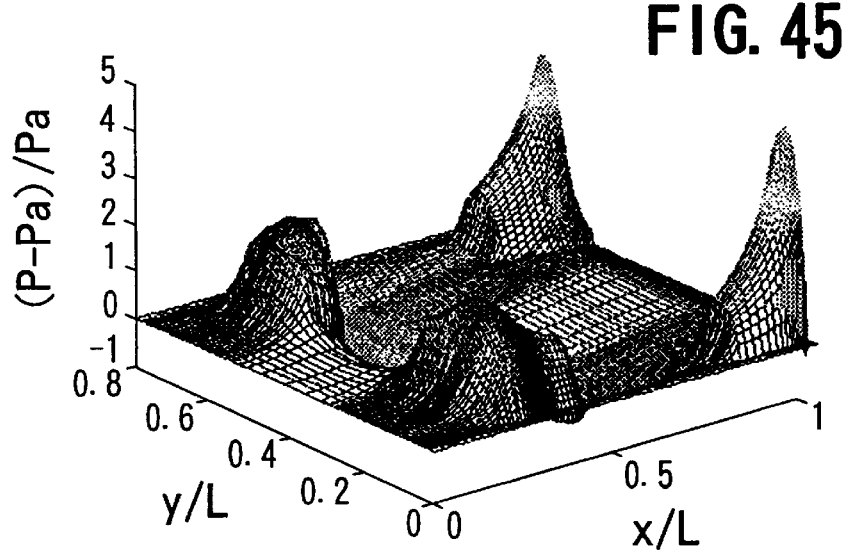
FIG. 45 shows computer simulation data that three-dimensionally illustrate the relationship between the normalized slider length and the normalized slider width, and the normalized pressure achieved by employing the head shown in FIG. 43 in the read/write apparatus shown in FIGS. 7 and 8.
Figure 46:
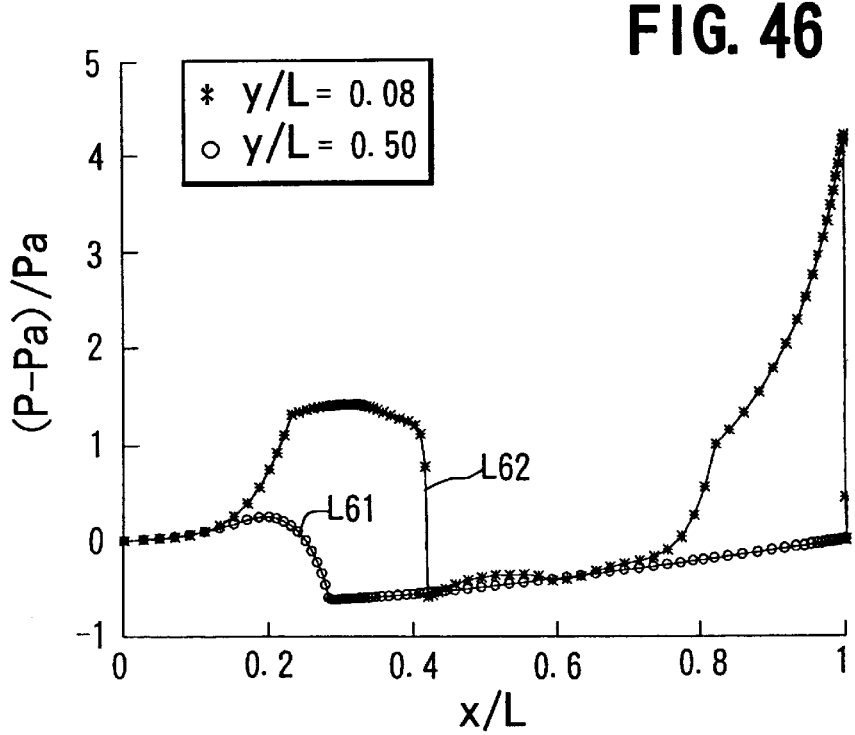
FIG. 46 shows data with respect to the relationship between the normalized slider length and the normalized pressure achieved by employing the head shown in FIG. 43 in the read/write apparatus shown in FIGS. 7 and 8.

(slider 1)
length L: 1.25 mm
width W: 1.0 mm thickness: 0.3 mm
weight: 1.6 mg
(head supporting mechanism 5)
load force: 0.5 gf
load point P1: offset d=100 µm
(disk-like medium 4)
disk rotational speed: 7200 rpm FIG. 45 presents computer simulation data that three-dimensionally illustrate the relationship between the normalized slider length (x/L) and the normalized width (y/L), and the normalized pressure when the head is employed, and FIG. 46 presents data illustrating the relationship between the normalized slider length (x/L) and the normalized pressure when the head is employed. The normalized slider length (x/L) represented by the horizontal axis and the normalized pressure (P−Pa)/Pa represented by the vertical axis are as has already been explained in reference to FIG. 35. In FIG. 46, the curve L61 represents the pressure distribution at a position expressed as the normalized width (y/L)=0.5 from one end edge of the slider 1 in the widthwise direction Y (approximately the center in the widthwise direction), and the curve L62 represents the pressure distribution achieved at a position expressed as the normalized width (y/L)=0.08.

The pressure distribution shown in FIGS. 45 and 46 differ from the pressure distribution illustrated in FIGS. 41 and 42 in that since the surface 152 of the fourth positive pressure generating portion 150 and the surface 162 of the fifth positive pressure generating portion 160 are provided extending to the trailing edge TR of the slider 1 at the leading edge LE, the positive pressures generated by the surface 152 of the fourth positive pressure generating portion 150 and the surface 162 of the fifth positive pressure generating portion 160 continue on to the trailing edge TR (see the curve L62) and that since there is no third positive pressure generating portion surface at the trailing edge TR, no positive pressure that is attributable to a third positive pressure generating portion is generated at approximately the central portion of the head 6 in the widthwise direction Y (see the curve L61).

As FIGS. 45 and 46 clearly indicate, when the disk-like medium 4 is caused to rotate, first lift dynamic pressures are generated by the first and second positive pressure generating portions 110 and 120 at the two sides in the widthwise direction Y of the head 6 along the airflow direction (a) (see the curve L62), second lift dynamic pressures are generated by the fourth and fifth positive pressure generating portions 150 and 160 toward the trailing edge TR and negative pressures are generated by the second and third negative pressure generating portions 170 and 180 further toward the air inflow side from the second lift dynamic pressures (see the curve L62). In addition, within an area enclosed by the first and second positive pressure generating portions 110 and 120, the fourth and fifth positive pressure generating portions 150 and 160 and the second and third negative pressure generating portions 170 and 180, a negative pressure is generated by the first negative pressure generating portion 130 (see the curve L61). The structure that achieves such pressure distribution is new, and it constitutes a basis for preventing contact between the head and the disk-like medium even at a flying height of 25 nm or less.

While there is no portion that generates a positive pressure at approximately the central portion of the head in the widthwise direction Y at the trailing edge TR, since the surface 152 of the fourth positive pressure generating portion 150 and the surface 162 of the fifth positive pressure generating portion 160 are provided extending to the trailing edge TR of the slider 1 at the two sides in the widthwise direction Y of the head 6, large positive pressures that continue on to the trailing edge TR are achieved by the surface 152 of the fourth positive pressure generating portion 150 and the surface 162 of the fifth positive pressure generating portion 160 (see the curve L62), thereby realizing an increase in the air lubricating film stiffness and resulting effective prevention of contact to reliably protect the transducers 2 and 3 provided at least at either the surface 152 of the fourth positive pressure generating portion 150 or the surface 162 of the fifth positive pressure generating portion 160 from damage and destruction.

The front flat surface 100 is provided toward the leading edge LE. The advantages achieved by this front flat surface 100 are that a small pitch angle β is realized and that flying characteristics with a reduction in fluctuation in the pitch angle β are achieved over the entire surface of the disk-like medium, as has been explained earlier.

Furthermore, the negative pressure generating portions 170 and 180 are formed so as to narrow starting from the side of the leading edge LE toward the central portion between the surface 112 of the first positive pressure generating portion 110 and the surface 152 of the fourth positive pressure generating portion 150 and between the surface 112 of the first positive pressure generating portion 110 and the surface 162 of the fifth positive pressure generating portion 160. The advantages achieved by this structure, too, have already been explained.

Figure 47:
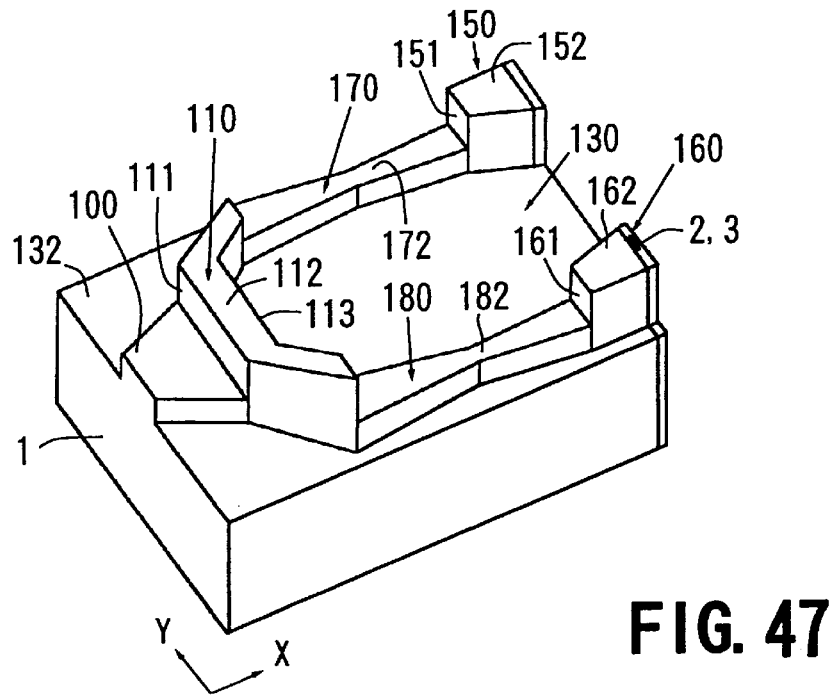
FIG. 47 illustrates a perspective of a seventh embodiment of the head according to the present invention.
Figure 48:
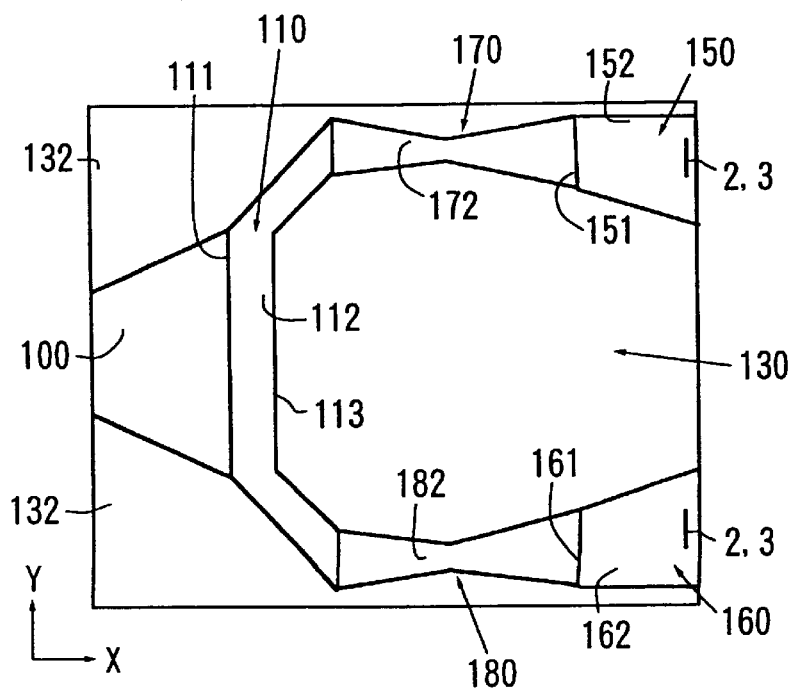
FIG. 48 illustrates a plan view of the head in FIG. 47 viewed from side where the surface facing the medium is located.

Referring to FIGS. 47 and 48 which show the seventh embodiment, the head according to the present invention comprises a slider 1 and transducers 2 and 3. The transducers 2 and 3 constitute two elements, i.e. a read/write element. In the head according to the present invention, the first and second positive pressure generating portions are oriented to cross the slider 1 in the widthwise direction Y to constitute a single positive pressure generating portion 110. Other structural features are practically identical to those in the embodiment illustrated in FIGS. 43 and 44.

Figure 49:
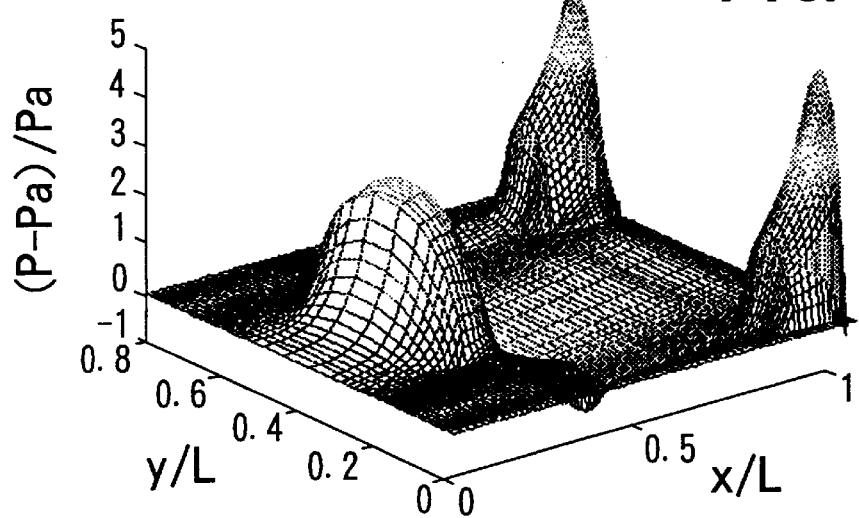
FIG. 49 shows computer simulation data that three-dimensionally illustrate the relationship between the normalized slider length and the normalized slider width, and the normalized pressure achieved by employing the head shown in FIG. 47 in the read/write apparatus shown in FIGS. 7 and 8.
Figure 50:
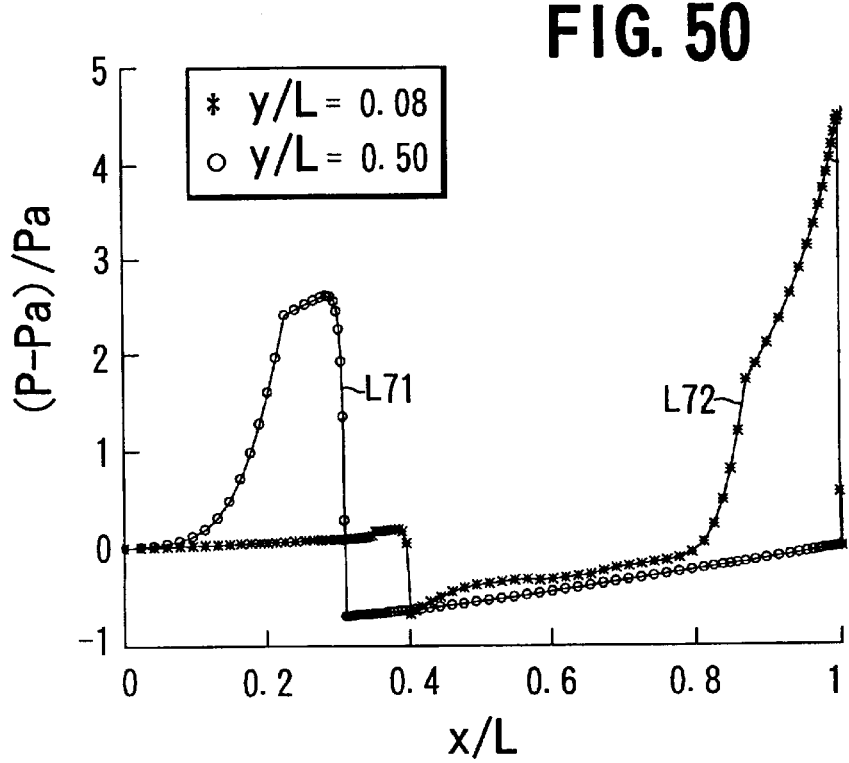
FIG. 50 shows data with respect to the relationship between the normalized slider length and the normalized pressure achieved by employing the head shown in FIG. 47 in the read/write apparatus shown in FIGS. 7 and 8.

FIG. 49 presents computer simulation data that three-dimensionally illustrate the relationship between the normalized slider length (x/L) and the normalized width (y/L), and the normalized pressure when the head is employed, and FIG. 50 presents data illustrating the relationship between the normalized slider length (x/L) and the normalized pressure achieved when the head is employed. The various conditions for driving the head 6, the head supporting mechanism 5 and the disk-like medium 4 are as has been explained earlier. The normalized slider length (x/L) represented by the horizontal axis and the normalized pressure (P−Pa)/Pa represented by the vertical axis have already been explained in reference to FIG. 35. The curve L71 represents the pressure distribution achieved at a position expressed as the normalized width (y/L)=0.5 from one end edge of the slider 1 in the widthwise direction Y (the approximate center in the widthwise direction), and the curve L72 represents the pressure distribution achieved at a position expressed as the normalized width (y/L)=0.08.

The pressure distribution illustrated in FIGS. 49 and 50 differ from the pressure distribution illustrated in FIGS. 45 and 46 in that since the first positive pressure generating portion 110 is oriented so as to cross the slider 1 in the widthwise direction Y toward the leading edge LE, a first lift dynamic pressure is generated by the first positive pressure generating portion 110 at approximately the central portion of the head 6 in the widthwise direction Y along the airflow direction (a) when the disk-like medium 4 is caused to rotate (see the curve L71). Otherwise, as the curve L71 and the curve L72 clearly indicate, characteristics that are similar to the pressure distribution illustrated in FIG. 46 are achieved, thereby realizing similar advantages.

FIG. 51 presents data illustrating the relationship between the skew angle θ and the flying height achieved by employing the heads disclosed with reference to embodiments 5 to 7. An explanation has already been given on the skew angle θ in reference to FIG. 9. In FIG. 51, the horizontal axis represents the rotating radius of the disk-like medium 4 which has a relationship of correspondence with the skew angle θ.

As the data in FIG. 51 indicate, an extremely small flying height of approximately 22 nm is assured over a wide skew angle range of −4.3 to 13.25° by employing any of the heads disclosed with reference to embodiments 5 to 7 according to the present invention. Furthermore, the fluctuation in the flying height is kept at approximately 1nm over the skew angle range of −4.3 to 13.25°, thereby achieving a high degree of flying stability against disturbance and vibration.

FIG. 52 presents data illustrating the relationship between the skew angle θ and the pitch angle β achieved by employing the heads disclosed with reference to embodiments 5 to 7. As the data indicate, the pitch angle β is maintained at $1.5 \times 10^{-4}$ (rad) or smaller over a wide skew angle range of −4.3 to 13.25° with all of the heads disclosed with reference to embodiments 5 to 7 according to the present invention. In particular, with the head disclosed with reference to embodiment 7, a stable pitch angle β of approximately $1 \times 10^{-4}$ (rad) is achieved over a wide skew angle range of −4.3 to 13.25°.

Figure 53:
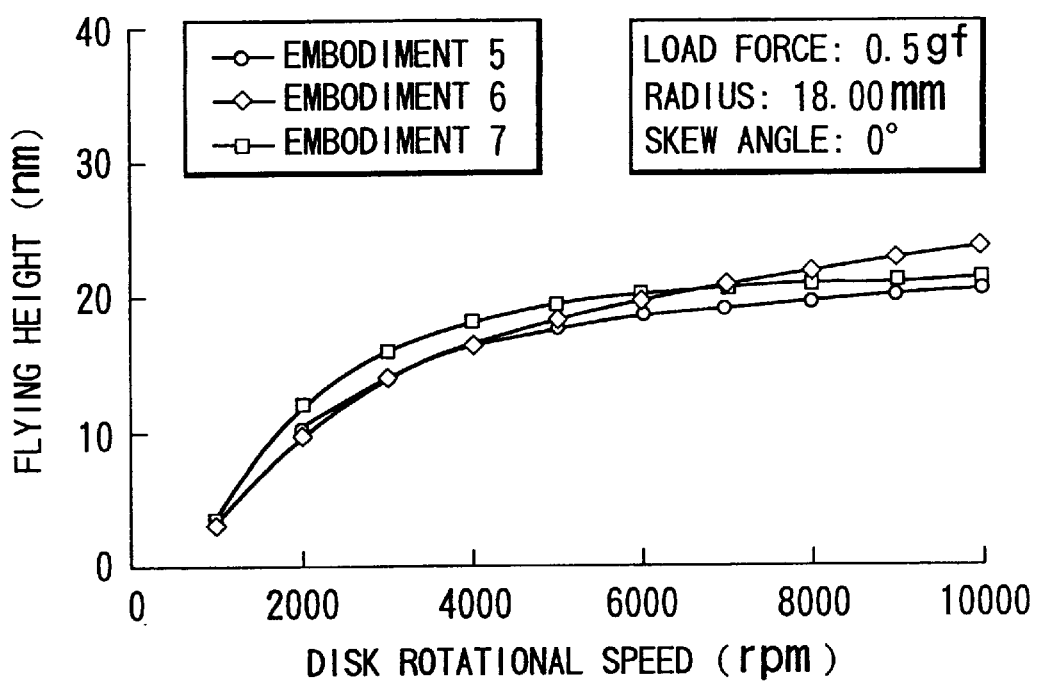
FIG. 53 shows data with respect to the relationship between the rotation rate of the disk-like medium (rpm) and the flying height achieved in a read/write apparatus employing the heads shown in FIGS. 39, 43 and 47.

FIG. 53 presents data illustrating the relationship between the disk rotational speed (rpm) of the disk-like medium 4 and the flying height achieved by employing the heads disclosed with reference to embodiments 5 to 7. In FIG. 53, the horizontal axis represents the disk-like medium rotation rate (rpm) and the vertical axis represents the flying height (nm). The skew angle θ is at approximately 0°.

FIG. 53 indicates that by employing the heads disclosed with reference to embodiments 5 to 7 according to the present invention, the flying height is made to become stable as the disk-like medium rotation rate increases. According to the data in FIG. 53, when the disk-like medium rotation rate exceeds approximately 6000 rpm, the flying height becomes stable at approximately 22 nm. Thus, the head according to the present invention achieves the takeoff characteristics whereby the flying height becomes stabilized earlier to enter a constant operating state.

While the present invention has been explained in detail in reference to specific preferred embodiments, it is obvious to persons skilled in the art that a number of variations are possible in its form and detail without departing from the essence and range of the present invention.

What is claimed is:

1. A slider for receiving air pressure at a surface facing a medium, said slider having a leading edge, a trailing edge, a first side and a second side, said surface comprising:
   a base surface extending from said leading edge to said trailing edge;
   a front portion having a height above said base surface, extending from the leading edge toward the trailing edge, and widening from the leading edge toward the trailing edge;
   a first positive pressure generating portion abutting said front portion, extending toward said trailing edge, having a first height above said front portion;
   a second positive pressure generating portion abutting said front portion, extending toward said trailing edge, having a second height above said front portion, said second height being essentially equal to said first height;
   a first negative pressure generating portion abutting said first positive pressure generating portion, extending toward said trailing edge, and having a third height below said first positive pressure generating portion;
   a second negative pressure generating portion abutting said second positive pressure generating portion, extending toward said trailing edge, and having a fourth height below said second positive pressure generating portion, said fourth height being essentially equal to said third height;
   a third positive pressure generating portion abutting said first negative pressure generating portion, extending toward said trailing edge, having a fifth height above said first negative pressure generating portion; and
   a fourth positive pressure generating portion abutting said second negative pressure generating portion, extending toward said trailing edge, having a sixth height above said second negative pressure generating portion, said sixth height being essentially equal to said fifth height.

2. The slider according to claim 1, wherein said third, fourth, fifth and sixth heights are greater than or equal to 0.1 μm.

3. The slider according to claim 1, wherein the first and second negative pressure generating portions narrow from said first and second positive pressure generating portions, respectively toward central portions and widen from said central portions toward said third and fourth positive pressure generating portions, respectively.

4. The slider according to claim 1, wherein said first positive pressure generating portion and said second positive pressure generating portion are continuous so as to constitute a single flat surface.

5. The slider according to claim 1, wherein said third positive pressure generating portion and said fourth positive pressure generating portion extend to said trailing edge.

6. The slider according to claim 1, wherein end edges that define said first and second negative pressure generating portions are straight lines, curved lines or a combination thereof.

7. The slider according to claim 1, wherein said surface facing a medium has a symmetrical shape relative to a central axis perpendicular to said leading edge.

8. The slider according to claim 1, wherein the first and second heights are within the inclusive range of 0.1 through 1.0 μm.

9. The slider according to claim 1 wherein:
   a distance between said leading edge and said trailing edge is 1.25 mm or less,
   a distance between said first and second sides is 1.00 mm or less, and
   said slider has a mass of 1.6 mg or less.

10. The slider according to claim 6, wherein said surface facing a medium further comprises:
    a fifth positive pressure generating portion extending to the trailing edge and having a height above said base surface.

11. The slider according to claim 1, wherein said third, fourth, fifth and sixth heights are essentially equal to each other.

12. A head for writing to and reading from a medium and being provided with a slider having a slider surface facing a medium and at least one transducer, said slider having a leading edge, a trailing edge, a first side and a second side, said slider surface comprising:
    a base surface extending from said leading edge to said trailing edge;

a front portion having a height above said base surface, extending from the leading edge toward the trailing edge, and widening from the leading edge toward the trailing edge;

a first positive pressure generating portion abutting said front portion, extending toward said trailing edge, having a first height above said front portion;

a second positive pressure generating portion abutting said front portion, extending toward said trailing edge, having a second height above said front portion, said second height being essentially equal to said first height;

a first negative pressure generating portion abutting said first positive pressure generating portion, extending toward said trailing edge, and having a third height below said first positive pressure generating portion;

a second negative pressure generating portion abutting said second positive pressure generating portion, extending toward said trailing edge, and having a fourth height below said second positive pressure generating portion, said fourth height being essentially equal to said third height;

a third positive pressure generating portion abutting said first negative pressure generating portion, extending toward said trailing edge, having a fifth height above said first negative pressure generating portion; and a fourth positive pressure generating portion abutting said second negative pressure generating portion, extending toward said trailing edge, having a sixth height above said second negative pressure generating portion, said sixth height being essentially equal to said fifth height.

13. The head according to claim 12, wherein said third, fourth, fifth and sixth heights are greater than or equal to 0.1 μm.

14. The head according to claim 12, wherein the first and second negative pressure generating portions narrow from said first and second positive pressure generating portions, respectively toward central portions and widen from said central portions toward said third and fourth positive pressure generating portions, respectively.

15. The head according to claim 12, wherein said first positive pressure generating portion and said second positive pressure generating portion are continuous so as to constitute a single flat surface.

16. The head according to claim 12, wherein said third positive pressure generating portion and said fourth positive pressure generating portion extend to said trailing edge; and said transducer is at least at either said third positive pressure generating portion or said fourth positive pressure generating portion.

17. The head according to claim 12, wherein end edges that define said first and second negative pressure generating portions are straight lines, curved lines or a combination thereof.

18. The head according to claim 12, wherein said surface facing a medium has a symmetrical shape relative to a central axis perpendicular to said leading edge.

19. The head according to claim 12, wherein the first and second heights are within the inclusive range of 0.1 through 1.0 μm.

20. The head according to claim 12 wherein:

a distance between said leading edge and said trailing edge is 1.25 mm or less, a distance between said first and second sides is 1.00 mm or less, and said slider has a mass of 1.6 mg or less.

21. The head according to claim 12, wherein said surface facing a medium further comprises:

a fifth positive pressure generating portion extending to the trailing edge and having a height above said base surface.

22. The head according to claim 12, wherein said third, fourth, fifth and sixth heights are essentially equal to each other.

23. A head device comprising a head suspension with one end thereof being a free end, and a head mounted to said free end of said head suspension in such a manner that pitch and roll movements thereof are allowed and that said head receives a load from said suspension, wherein said head comprises a slider with a surface facing a medium and at one transducer, said slider having a leading edge, a trailing edge, a first side and a second side, said surface comprising:

a base surface extending from said leading edge to said trailing edge;

a front portion having a height above said base surface, extending from the leading edge toward the trailing edge, and widening from the leading edge toward the trailing edge;

a first positive pressure generating portion abutting said front portion, extending toward said trailing edge, having a first height above front portion;

a second positive pressure generating portion abutting said front portion, extending toward said trailing edge, having a second height above said front portion, said second height being essentially equal to said first height;

a first negative pressure generating portion abutting said first positive pressure generating portion, extending toward said trailing edge, and having a third height below said first positive pressure generating portion;

a second negative pressure generating portion abutting said second positive pressure generating portion, extending toward said trailing edge, and having a fourth height below said second positive pressure generating portion, said fourth height being essentially equal to said third height;

a third positive pressure generating portion abutting said first negative pressure generating portion, extending toward said trailing edge, having a fifth height above said first negative pressure generating portion; and a fourth positive pressure portion abutting said negative pressure generating portion, extending toward said trailing edge, having a sixth height above said second negative pressure generating portion, said sixth height being essentially equal to said fifth height.

24. The head device according to claim 23, wherein said third, fourth, fifth and sixth heights are greater than or equal to 0.1 μm.

25. The head device according to claim 23, wherein the first and second negative pressure generating portions narrow from said first and second positive pressure generating portions, respectively toward central portions and widen from said central portions toward said third and fourth positive pressure generating portions, respectively.

26. The head device according to claim 23, wherein said first positive pressure generating portion and said second positive pressure generating portion are continuous so as to constitute a single flat surface.

27. The head device according to claim 23, wherein said third positive pressure generating portion and said fourth positive pressure generating portion extend to said trailing edge; and said transducer is at least at either said third positive pressure generating portion or said fourth positive pressure generating portion.

28. A head device according to claim 23, wherein end edges that define said first and second negative pressure generating portions are straight lines, curved lines or a combination thereof.

29. The head device according to claim 23, wherein said surface facing a medium has a symmetrical shape relative to a central axis perpendicular to said leading edge.

30. The head device according to claim 23, wherein the first and second heights are within the inclusive range of 0.1 through 1.0 $\mu$m.

31. The head device according to claim 23 wherein:
   a distance between said leading edge and said trailing edge is 1.25 mm or less,
   a distance between said first and second sides is 1.00 mm or less, and
   said slider has a mass of 1.6 mg or less.

32. The head device according to claim 23, wherein said surface facing a medium further comprises:
   a fifth positive pressure generating portion extending to the trailing edge and having a height above said base surface.

33. The head device according to claim 23, wherein said third, fourth, fifth and sixth heights are essentially equal to each other.

34. A read/write apparatus comprising a disk-like medium that is driven to rotate and a read/write apparatus including a head suspension with one end thereof being a free and a head mounted to said free end of said head suspension in such a manner that pitch and roll movements thereof are allowed and that said head receives a load from said suspension, said slider having a leading edge, a trailing edge, a first side and a second side, said surface facing a medium comprising:
   a base surface extending from said leading edge to said trailing edge;
   a front portion having a height above said base surface, extending from the leading edge toward the trailing edge, and widening from the leading edge toward the trailing edge;
   a first positive generating portion abutting said front portion, extending toward said trailing edge, having a first height above said front portion;
   a second positive pressure generating portion abutting said front portion, extending toward said trailing edge, having a second height above front portion, said second height being essentially equal to said first height;
   a first negative pressure generating portion abutting said first pressure generating portion, extending toward said trailing edge, and having a third height below said first positive pressure generating portion;
   a second negative pressure generating portion abutting said second positive pressure generating portion, extending toward said trailing edge, and having a fourth height below said second positive pressure generating portion, said fourth height being essentially equal to said third height;
   a third positive pressure generating portion abutting said first negative pressure generating portion, extending toward said trailing edge, having a fifth height above said first negative pressure generating portion; and
   a fourth positive pressure generating portion abutting said second negative pressure generating portion, extending toward said trailing edge, having a sixth height above said second negative pressure generating portion, said sixth height being essentially equal to said fifth height.

35. The read/write apparatus according to claim 34, wherein said third, fourth, fifth and sixth heights are greater than or equal to 0.1 $\mu$m.

36. The read/write apparatus according to claim 34, wherein the first and second negative pressure generating portions narrow from said first and second positive pressure generating portions, respectively toward central portions and widen from said central portions toward said third and fourth positive pressure generating portions, respectively.

37. The read/write apparatus according to claim 34, wherein said first positive pressure generating portion and said second positive pressure generating portion are continuous so as to constitute a single flat surface.

38. The read/write apparatus according to claim 34, wherein said third positive pressure generating portion and said fourth positive pressure generating portion extend to said trailing edge; and
   said transducer is at least at either said third positive pressure generating portion or said fourth positive pressure generating portion.

39. The read/write apparatus according to claim 34, wherein end edges that define said first and second negative pressure generating portions are straight lines, curved lines or a combination thereof.

40. The read/write apparatus according to claim 34, wherein said surface facing a medium has a symmetrical shape relative to a central axis perpendicular to said leading edge.

41. The read/write apparatus according to claim 23, wherein the first and second heights are within the inclusive range of 0.1 through 1.0 $\mu$m.

42. The read/write apparatus according to claim 34 wherein:
   a distance between said leading edge and said trailing edge is 1.25 mm or less,
   a distance between said first and second sides is 1.00 mm or less, and
   said slider has a mass of 1.6 mg or less.

43. The read/write apparatus according to claim 34, wherein said surface facing a medium further comprises:
   a fifth positive pressure generating portion extending to the trailing edge and having a height above said base surface.

44. The read/write apparatus according to claim 34, wherein said third, fourth, fifth and sixth heights are essentially equal to each other.

* * * * *